United States Patent
Sugai et al.

(10) Patent No.: US 7,854,680 B2
(45) Date of Patent: Dec. 21, 2010

(54) CONTROL DEVICE AND CONTROL METHOD FOR POWER TRAIN

(75) Inventors: Shinichi Sugai, Toyota (JP); Mitsuaki Higa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 512 days.

(21) Appl. No.: 12/068,532

(22) Filed: Feb. 7, 2008

(65) Prior Publication Data
US 2008/0188346 A1    Aug. 7, 2008

(30) Foreign Application Priority Data
Feb. 7, 2007    (JP) .............................. 2007-028038

(51) Int. Cl.
*B60K 1/02* (2006.01)
(52) U.S. Cl. ................................ 477/15; 477/3; 477/20
(58) Field of Classification Search ............... 477/2, 477/3, 15, 20
See application file for complete search history.

(56) References Cited

U.S. PATENT DOCUMENTS

| | | | |
|---|---|---|---|
| 6,278,195 B1 * | 8/2001 | Yamaguchi et al. ........ 290/40 A |
| 6,817,965 B2 * | 11/2004 | Tabata .......................... 477/33 |
| 2003/0199361 A1 * | 10/2003 | Tabata .......................... 477/181 |
| 2004/0148071 A1 | 7/2004 | Itoh et al. |
| 2009/0151491 A1 * | 6/2009 | Tabata et al. .................. 74/335 |

FOREIGN PATENT DOCUMENTS

| | | |
|---|---|---|
| JP | A-2001-295683 | 10/2001 |
| JP | A-2004-229373 | 8/2004 |
| JP | A-2006-083734 | 3/2006 |
| JP | A-2006-094617 | 4/2006 |
| JP | A-2006-327436 | 12/2006 |

* cited by examiner

*Primary Examiner*—Ha D. Ho
(74) *Attorney, Agent, or Firm*—Oliff & Berridge, PLC

(57) ABSTRACT

In a power train in which a differential mechanism is coupled with a transmission mechanism, a transmission member is free with no engagement in a second shift portion when a P position or an N position is selected, and a ring gear thereby becomes free in a power split device. During an idle operation with such a shift position, a behavior of an engine rotation speed is retained in a stable manner in the power split device which functions as the differential mechanism through a power supply control (lock control) such that a rotor of a second MG coupled with the ring gear is locked by an electromagnetic force, and then, a learning control of an idle speed control is appropriately implemented.

14 Claims, 16 Drawing Sheets

FIG. 3

|  | C0 | C1 | C2 | B0 | B1 | B2 | B3 | GEAR RATIO | STEP |
|---|---|---|---|---|---|---|---|---|---|
| 1ST | ◎ | ○ | × | × | × | × | ○ | 3.357 | |
| 2ND | ◎ | ○ | × | × | × | ○ | × | 2.180 | 1.54 |
| 3RD | ◎ | ○ | × | × | ○ | × | × | 1.424 | 1.53 |
| 4TH | ◎ | ○ | ○ | × | × | × | × | 1.000 | 1.42 |
| 5TH | × | ○ | ○ | ◎ | × | × | × | 0.705 | 1.42 |
| R | × | × | ○ | × | × | × | ○ | 3.209 | |
| N | × | × | × | × | × | × | × | | TOTAL 4.76 |
| P | × | × | × | × | × | × | × | | |

○ ENGAGED
× DISENGAGED
◎ ENGAGED IN STEPWISE SHIFT STATE,
  DISENGAGED IN CONTINUOUS SHIFT STATE

|  | C0 | C1 | C2 | B0 | B2 | B3 | GEAR RATIO | STEP |
|---|---|---|---|---|---|---|---|---|
| 1ST | ◎ | ○ | × | × | × | ○ | 2.804 | |
| 2ND | ◎ | ○ | × | × | ○ | × | 1.531 | 1.54 |
| 3RD | ◎ | ○ | ○ | × | × | × | 1.000 | 1.53 |
| 4TH | × | ○ | ○ | ◎ | × | × | 0.705 | 1.42 |
| R | × | × | ○ | × | × | ○ | 2.393 | |
| N | × | × | × | × | × | × | | TOTAL 3.977 |
| P | × | × | × | × | × | × | | |

○ ENGAGED
× DISENGAGED
◎ ENGAGED IN STEPWISE SHIFT STATE,
  DISENGAGED IN CONTINUOUS SHIFT STATE

CONTROL DEVICE AND CONTROL METHOD FOR POWER TRAIN

This nonprovisional application is based on Japanese Patent Application No. 2007-028038 filed with the Japan Patent Office on Feb. 7, 2007, the entire contents of which are hereby incorporated by reference.

BACKGROUND OF THE INVENTION

1. Field of the Invention

The present invention relates to a control device and a control method for a power train, and more particularly to a technology for controlling a power train of a hybrid vehicle including an engine and a rotating electric machine as mechanical power sources.

2. Description of the Background Art

Conventionally, there is known a hybrid vehicle including an internal combustion engine and a rotating electric machine as driving sources. In such a hybrid vehicle, the internal combustion engine and the rotating electric machine are separately used in accordance with a traveling condition of the vehicle. For example, the internal combustion engine is mainly used when the vehicle travels at a high speed, while the rotating electric machine is mainly used when the vehicle travels at an intermediate or low speed. In some of this hybrid vehicle, a differential mechanism in which the engine and the rotating electric machine are coupled with each other functions as a continuously variable transmission.

In particular, Japanese Patent Laying-Open No. 2006-094617 discloses a vehicle driving device adapted to transmit an output of a driving power source to drive wheels via a differential unit including the above described differential mechanism and a stepwise shift transmission coupled with a rear stage of the differential unit by a transmission member.

A control device of the vehicle driving device disclosed in Japanese Patent Laying-Open No. 2006-094617 includes a switching clutch or a switching brake for switching the transmission mechanism between a continuous shift state and a stepwise shift state, so that a driving device can advantageously obtain both of a fuel consumption improving effect of a transmission device in which a gear ratio is electrically converted and a high transmitting efficiency of a stepwise shift transmission device in which power is mechanically transmitted.

However, in the vehicle driving device disclosed in Japanese Patent Laying-Open No. 2006-094617, the transmission member which couples the differential mechanism with the stepwise shift transmission is free with no engagement in the stepwise shift transmission when a parking (P) position or a neutral (N) position is selected. Therefore, the engine is idly operated in a state where one of rotating elements (ring gear) constituting the differential mechanism is free with no engagement, and a behavior of an engine rotation speed at the time of the idle speed control (ISC) possibly becomes unstable due to the differential operation in the differential mechanism. The term "rotation speed" recited in the present specification denotes the number of rotations per unit time (typically, rpm) unless any specific description is given.

When a learning control that corrects an amount set by the ISC based on an engine rotation speed actual value during a period when the ISC is implemented in the foregoing condition, the rotation speed may in an idle state be excessively increased or significantly reduced to unfavorably invite an engine stall when the ISC is implemented next due to misleading learning.

SUMMARY OF THE INVENTION

Therefore, the present invention was implemented in order to solve the foregoing problem, and a main object thereof is to appropriately implement the learning control of the idle speed control at the time of the selection of any shift position that the rotating elements of the differential mechanism coupled with the transmission mechanism are free with no engagement in the transmission mechanism in the power train in which the differential mechanism and the transmission mechanism are coupled with each other.

In a control device for a power train according to the present invention, the power train includes a differential mechanism provided with a first rotating element coupled with a rotor of a first rotating electric machine, a second rotating element coupled with a rotor of a second rotating electric machine and a third rotating element coupled with an output shaft of an engine, and a transmission mechanism coupled with the second rotating element and transmitting torque inputted from the second rotating element to a wheel. The control device includes an idle speed control portion, a learning control portion and a rotation lock control portion. The idle speed control portion is configured to control an engine rotation speed when the engine is in an idle operation. The learning control portion is configured to implement a learning control in order to correct a set amount of the engine control by the idle speed control portion based on an actual engine rotation speed during the idle operation. The rotation lock control portion is configured to control power supply to the second rotating electric machine so that the rotation of the rotor of the second rotating electric machine is locked by an electromagnetic force generated in the second rotating electric machine when the learning control is implemented at the time of the selection of a predetermined shift position in which the second rotating element is not engaged with another rotating element in the transmission mechanism.

A control method for a power train according to the present invention is a control method for the power train configured as described above, including a step of determining whether or not a predetermined shift position in which the second rotating element is not engaged with another rotating element in the transmission mechanism is selected, and a step of controlling the power supply to the second rotating electric machine so that the rotation of the rotor of the second rotating electric machine is locked by the electromagnetic force generated in the second rotating electric machine when the learning control in order to correct the set amount of the engine control by the idle speed control during an idle operation of the engine based on an actual engine rotation speed during the idle operation wherein the predetermined shift position is selected.

According to the control device and the control method for the power train thus constituted, when the predetermined shift position (typical examples are P position and N position) in which the second rotating element which couples the differential mechanism and the transmission mechanism with each other is free with no engagement in the transmission mechanism is selected, the learning control (ISC learning) of the ISC (idle speed control) can be implemented in the state where the rotation of the rotor of the second rotating electric machine is locked by the electromagnetic force. Therefore, the ISC learning can be implemented in the state where the second rotating element is locked in the differential mechanism and the behavior of the engine rotation speed is stabilized. As a result, the ISC learning can be appropriately performed, and the engine rotation speed during the idle operation can be appropriately set.

Preferably, the rotation lock control portion is configured to control the power supply to the second rotating electric machine so that the rotation of the rotor of the second rotating electric machine is locked by the electromagnetic force during the idle operation of the stopped vehicle wherein the predetermined shift position is selected. Alternatively, in the foregoing step of controlling, the power supply to the second rotating electric machine is controlled so that the rotation of the rotor of the second rotating electric machine is locked by the electromagnetic force during the idle operation of the stopped vehicle wherein the predetermined shift position is selected.

Accordingly, during the idle operation of the stopped vehicle wherein the predetermined shift position (P position, N position) is selected, the power supply is controlled in order to generate the electromagnetic force for locking the rotor of the second rotating electric machine (hereinafter, may be referred to as lock control). As a result, the appropriate ISC learning can be speedily started.

Preferably, the learning control portion is configured to prohibit the implementation of the learning control except for a period when the power supply to the second rotating electric machine is controlled so that the rotation of the rotor of the second rotating electric machine is locked by the electromagnetic force during the idle operation wherein the predetermined shift position is selected. Alternatively, the control method further includes a step of prohibiting the implementation of the learning control except for the period when the power supply to the second rotating electric machine is controlled so that the rotation of the rotor of the second rotating electric machine is locked by the electromagnetic force during the idle operation wherein the predetermined shift position is selected.

Accordingly, the implementation of the ISC learning can be prohibited during a period when the locking control of the second rotating electric machine is not implemented during the idle operation wherein the predetermined shift position (P position, N position) is selected. As a result, such an ISC learning that the second rotating element is not locked and the behavior of the engine rotation speed is unstable can be avoided, which prevents the set amount by the ISC from showing any inappropriate value due to the misleading learning.

Preferably, the control device further includes a learning condition determine portion. The learning condition determine portion is configured to determine whether or not conditions for implementing the learning control are satisfied during the idle operation and generating a learning request when the conditions are satisfied. Then, the rotation lock control portion generates a control instruction for locking the rotation of the rotor of the second rotating electric machine by the electromagnetic force when the learning request is generated by the learning condition determine portion at the time of the selection of the predetermined shift position. Alternatively, the control method preferably further includes a step of determining whether or not the learning request to be generated when the conditions for implementing the learning control are satisfied is generated during the idle operation. In the foregoing step of controlling, the control instruction for locking the rotation of the rotor of the second rotating electric machine by the electromagnetic force is generated when the learning request is generated at the time of the selection of the predetermined shift position.

Thus configured, during the idle operation of the stopped vehicle wherein the predetermined shift position (P position, N position) is selected, the lock instruction for the second rotating electric machine in order to normally implement the ISC learning can be generated only in the case where the ISC learning request is generated. Accordingly, the second rotating electric machine can be subjected to the lock control also when the ISC learning is unnecessary, which prevents the increase of power consumption.

Further preferably, the control device further includes a rotation speed control portion. The rotation speed control portion is preferably adapted to set a targeted rotation speed of the first rotating electric machine for setting a rotation speed of the second rotating electric machine to be around zero to thereby control power supply to the first rotating electric machine so that the first rotating electric machine is operated based on the targeted rotation speed during the idle operation of the stopped vehicle and when the predetermined shift position is selected and the learning request is not generated by the learning condition determine portion. Alternatively, the control method further includes a step of setting the targeted rotation speed of the first rotating electric machine for setting the rotation speed of the second rotating electric machine to be around zero so that the first rotating electric machine is operated based on the targeted rotation speed during the idle operation of the stopped vehicle and when the predetermined shift position is selected and the learning request is not generated. The targeted rotation speed is set in accordance with the product of an engine rotation speed targeted value by the idle speed control and a predetermined gear ratio in the differential mechanism.

Accordingly, during the idle operation of the stopped vehicle and when the predetermined shift position (P position, N position) is selected and the ISC learning request is not generated, the second rotating electric machine is not subjected to the lock control and the rotation speed of the second rotating electric machine can be approximate to zero by the differential action when the rotation speed of the first rotating electric machine is controlled. As a result, the second rotating electric machine can be speedily locked when the ISC learning request is generated during the idle operation, and the ISC learning can be implemented in a short period of time.

Preferably, the predetermined shift position includes a parking position and a neutral position. The rotation lock control portion is configured to control the power supply to the second rotating electric machine so that the rotation of the rotor of the second rotating electric machine is locked by the electromagnetic force when the neutral position is selected and the implementation of the learning control is instructed during the idle operation of the traveling vehicle. Alternatively, in the foregoing step of controlling, the power supply to the second rotating electric machine is controlled so that the rotation of the rotor of the second rotating electric machine is locked when the neutral position is selected and the implementation of the learning control is instructed during the idle operation of the traveling vehicle.

Thus configured, the ISC learning can be implemented with the stabilized behavior of the engine rotation speed because of the lock control of the second rotating electric machine when the N position is selected and the vehicle is traveling.

Further preferably, the transmission mechanism is configured to transmit torque inputted to the second rotating element to a drive wheel in accordance with a gear ratio of each gear switched according to a predetermined combination of the engagement and disengagement of a plurality of frictional engagement elements. The control device preferably further includes an up-shift portion. The up-shift portion is configured to change the gear of the transmission mechanism so that the gear ratio is changed in a direction where the rotation speed of the second rotating element is reduced when the neutral position is selected and the implementation of the learning control is instructed during the idle operation of the traveling vehicle. The control method preferably further includes a step of changing the gear of the transmission mechanism so that the gear ratio is changed in the direction where the rotation speed of the second rotating element is reduced when the neutral position is selected and the implementation of the learning control is instructed during the idle operation of the traveling vehicle.

Accordingly, during the idle operation of the traveling vehicle wherein the N position is selected, the rotation speed of the second rotating element (transmission member) can be reduced by the up-shift in the transmission mechanism. Therefore, the second rotating element can be speedily locked by the lock control for the second rotating electric machine. As a result, the ISC learning can be implemented in a short period of time.

As described thus far, the present invention is advantageous in that the learning control of the idle speed control can be appropriately executed at the time of the selection of the shift position in which the rotating element of the differential mechanism coupled with the transmission mechanism is non-engaged in the transmission mechanism in the power train in which the differential mechanism and the transmission mechanism are coupled with each other.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is an operation table of the transmission shown in FIG. 2.

DESCRIPTION OF THE PREFERRED EMBODIMENTS

Figure 1:
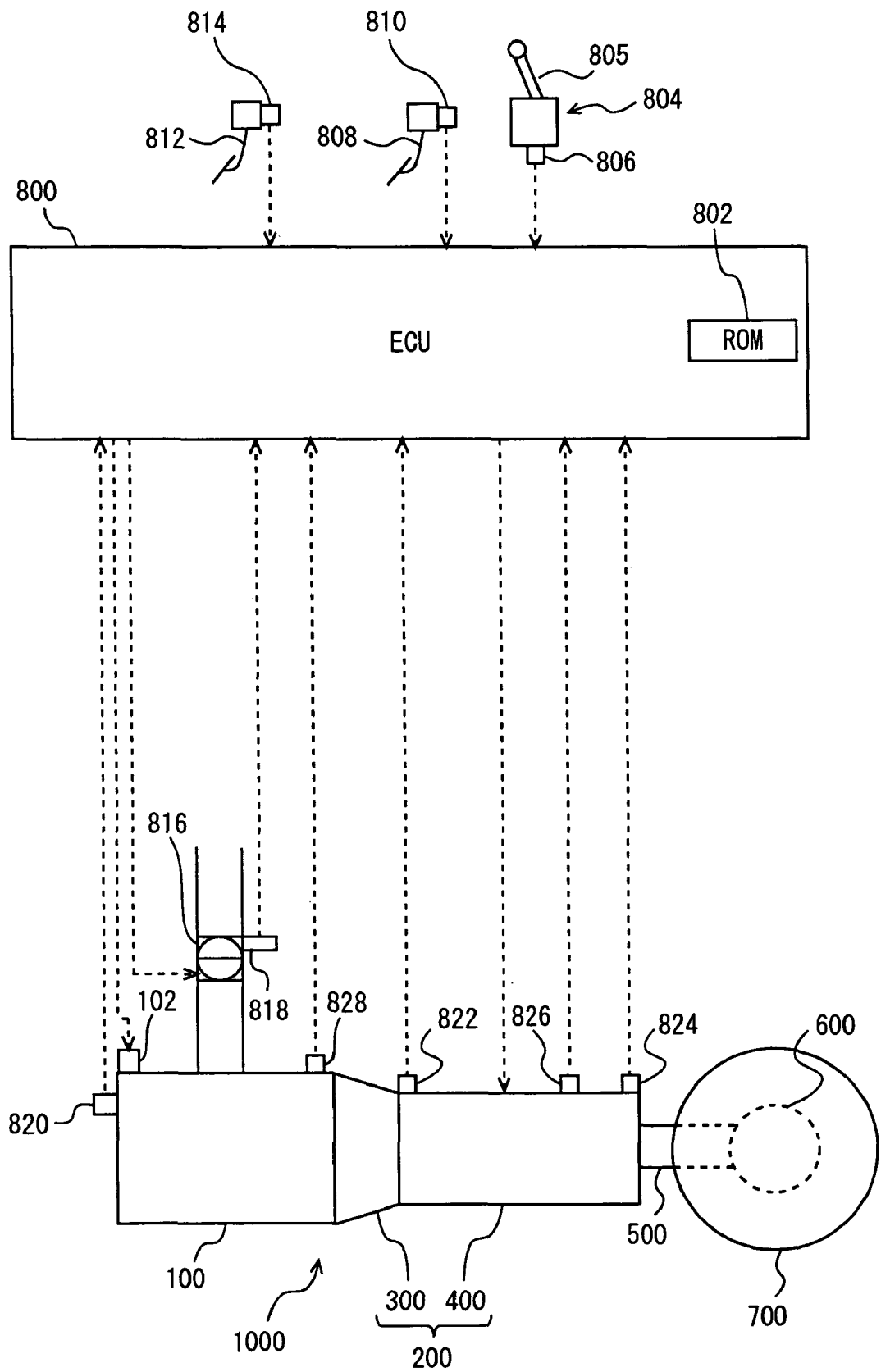
FIG. 1 is a block diagram illustrating a schematic configuration of a hybrid vehicle provided with a control device for a power train according to an embodiment of the present invention.

Hereinafter, preferred embodiments of the present invention are described in detail referring to the drawings. In the description below, the same or similar components are provided with the same reference symbols, and description of such components are not repeated on principle.

Description of Constitution of Power Train

Referring to FIG. 1, a schematic configuration of a hybrid vehicle provided with a control device for a power train according to the embodiment of the present invention is described. In FIG. 1, the hybrid vehicle is shown as an FR (Front Engine Rear Drive) vehicle, however, the present invention can be applied to any hybrid vehicle other than the FR.

The hybrid vehicle includes an engine 100, a transmission 200, a propeller shaft 500, a differential gear 600, rear wheels 700 as drive wheels, and an ECU (Electronic Control Unit) 800. The control device for power train according to the present embodiment is realized, for example, when a program recorded in a ROM (Read Only Memory) 802 of ECU 802 is executed.

A power train 1000 controlled by ECU 800, which is the control device according to the present embodiment, includes engine 100 and transmission 200.

Engine 100 is an internal combustion engine in which an air-fuel mixture obtained from fuel and air injected from an injector 102 is combusted in a combustion chamber of a cylinder. The combustion presses a piston in the cylinder downward, which rotates a crank shaft.

Transmission 200 is coupled to engine 100. Transmission 200 includes a first shift portion 300 and a second shift portion 400 as described later. A torque outputted from transmission 200 is transmitted to the right and left rear wheels 700 via propeller shaft 500 and differential gear 600.

Connected to ECU 800 via harness or the like are a position switch 806 of a shift lever 805 provided in a shift operation portion 804, an accelerator pedal position sensor 810 of an accelerator pedal 818, a brake switch 814 of a brake pedal 812, a throttle position sensor 818 of an electronic throttle valve 816, an engine rotation speed sensor 820, an input shaft rotation speed sensor 822, an output shaft rotation speed sensor 824, an oil temperature sensor 826 and a water temperature sensor 828.

A position of shift lever 805 is detected by position switch 806, and a signal showing a result of the detection is transmitted to ECU 800. The shift gear in transmission 200 is automatically changed in accordance with the position of shift lever 805.

Accelerator pedal position sensor 810 detects a position of accelerator pedal 808, and transmits a signal showing a result of the detection to ECU 800. Brake switch 814 detects a braking operation (operation of brake pedal 812 by a driver), and transmits a signal showing a result of the detection to ECU 800.

Throttle position sensor 818 detects a position of electronic throttle valve 816 having its position adjusted by an actuator, and transmits a signal showing a result of the detection to ECU 800. The amount of air taken into engine 100 (output of the engine 100) is adjusted by electronic throttle valve 816.

It is to be noted that, in place of or in addition to electronic throttle valve 816, a lifting amount or opening and closing phases of an intake valve (not shown) and an exhaust valve (not shown) may be changed so that the amount of air taken into engine 100 is adjusted.

Engine rotation speed sensor 820 detects a rotation speed of the output shaft (crank shaft) of engine 100 and transmits a signal showing a result of the detection to ECU 800. Input shaft rotation speed sensor 822 detects an input shaft rotation speed NI of the second shift portion 400 and transmits a signal showing a result of the detection to ECU 800. Output shaft rotation speed sensor 824 detects an output shaft rotation speed NO of transmission 200 (second shift portion 400) and transmits a signal showing a result of the detection to ECU 800.

Oil temperature sensor 826 detects a temperature (oil temperature) of oil (ATF: Automatic Transmission Fluid) used for the actuation and lubrication of transmission 200 and transmits a signal showing a result of the detection to ECU 800.

Water temperature sensor 828 detects a temperature (water temperature) of cooling water of engine 100 and transmits a signal showing a result of the detection to ECU 800.

ECU 800 controls the various components so that the vehicle is in a desirable traveling condition based on the signals transmitted from position switch 806, accelerator pedal position sensor 810, brake switch 814, throttle position sensor 818, engine rotation speed sensor 820, input shaft rotation speed sensor 822, output shaft rotation speed sensor 824, oil temperature sensor 826, water temperature sensor 828H and the like, and the program and map memorized in ROM 802.

Figure 2:
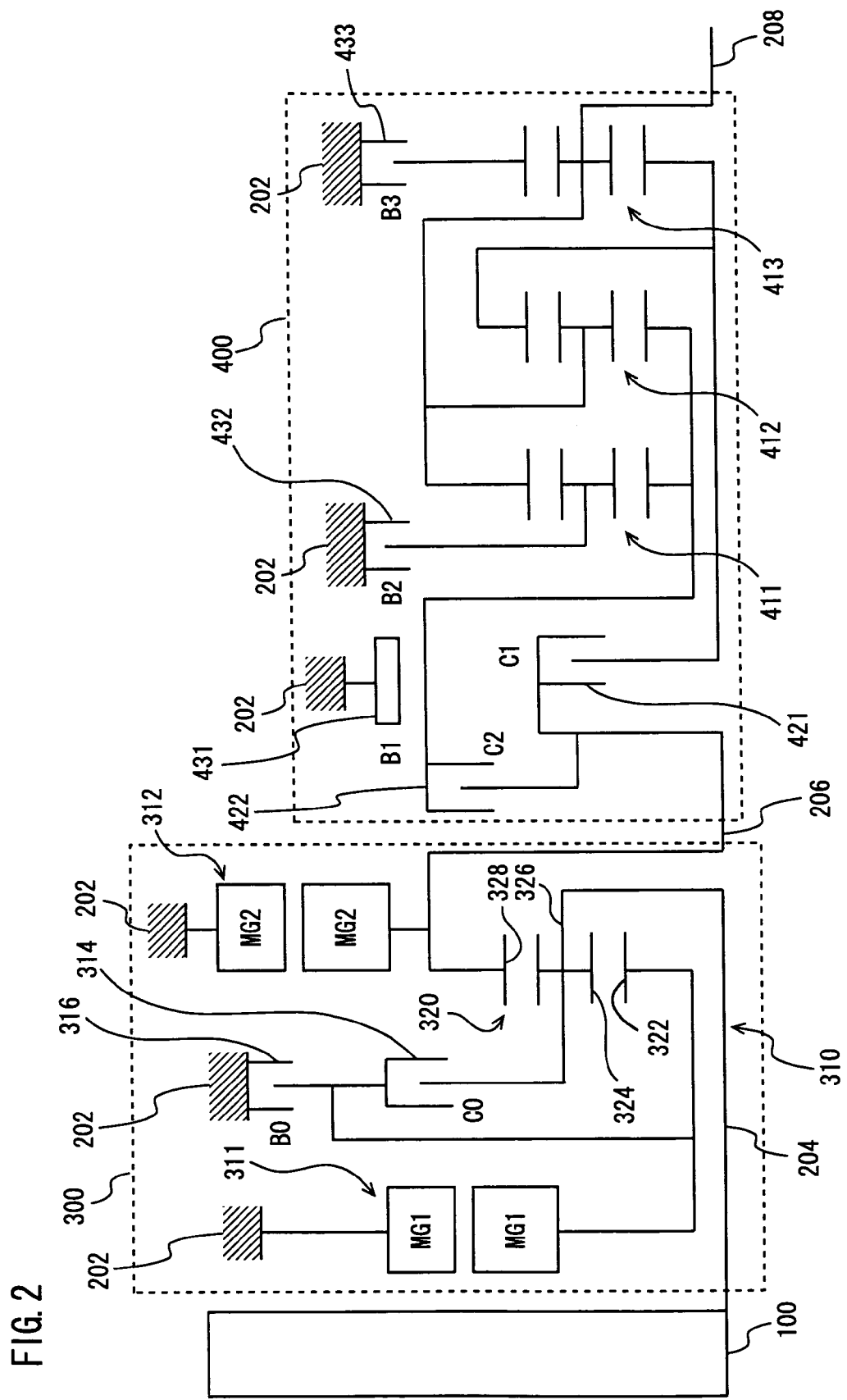
FIG. 2 is a skeleton diagram showing an outline of an exemplary configuration of the transmission shown in FIG. 1.

Next, using FIG. 2, a detailed configuration of transmission 200 shown in FIG. 1 is described.

Referring to FIG. 2, included in transmission 200 as coaxially arranged in a case 202 that is a non-rotary member mounted on the vehicle body are: an input shaft 204 being an input rotary member; a first shift portion 300 coupled directly or via a damper (not shown) to input shaft 204; a second shift portion 400 serially coupled in a power transmitting route between first shift portion 300 and rear wheels 700 via a transmission member (transmission shaft) 206; and an output shaft 208 being an output rotary member coupled to second shift portion 400. Second shift portion 400 corresponds to the "transmission mechanism" according to the present invention.

Transmission 200 is configured symmetrically relative to its axis. Accordingly, the lower part of transmission 200 is omitted in FIG. 2 in the portion where transmission 200 is shown.

First shift portion 300 includes a power split device 310, a first MG (Motor Generator) 311, and a second MG 312. First shift portion 300 further includes two engagement elements of a C0 clutch 314 and a B0 brake 316.

Power split device 310 splits the output of engine 100 inputted to input shaft 204 for first MG 311 and transmission member 206. A planetary gear 320 constitutes power split device 310. Power split device 310 corresponds to the "differential mechanism" according to the present invention.

Planetary gear 320 includes a sun gear 322, a pinion gear 324, a carrier 326 supporting pinion gear 324 so that it can rotate on its own axis and revolve around sun gear 322, and a ring gear 328 meshing with sun gear 322 via pinion gear 324.

In power split device 310, carrier 326 is coupled to input shaft 204, i.e., to engine 100. Sun gear 322 is coupled to first MG 311. Ring gear 328 is coupled to second MG 312 via transmission member 206. More specifically, sun gear 322 corresponds to the "first rotating element" according to the present invention, ring gear 328 and transmission member 206 correspond to the "second rotating element" according to the present invention, and carrier 326 corresponds to the "third rotating element" according to the present invention.

Power split device 310 functions as a differential apparatus, by the relative rotation of sun gear 322, carrier 326, and ring gear 328. By the differential function of power split device 310, the output of engine 100 is divided for first MG 311 and for transmission member 206.

First MG 311 generates power using part of the divided output of engine 100, and/or second MG 312 rotates using the power generated by first MG 311, whereby power split device 310 functions as a continuously variable transmission.

First MG 311 and second MG 312 are three-phase alternating current rotating electric machines (electric motors). First MG 311 is coupled to sun gear 322 of power split device 310. Second MG 312 is provided such that rotors integrally rotate with transmission member 206.

First MG 311 and second MG 312 are controlled so as to satisfy target output torque of transmission 200 that is calculated from, for example, the accelerator pedal position and the vehicle speed, and to realize the optimum fuel efficiency in engine 100.

C0 clutch 314 is provided so as to couple sun gear 322 and carrier 326. B0 brake 316 is provided so as to couple sun gear 322 to case 202.

Second shift portion 400 includes three single pinion type planetary gears 411-413 and five engagement elements of a C1 clutch 421, a C2 clutch 422, a B1 brake 431, a B2 brake 432, and a B3 brake 433.

To C0 clutch 314, C1 clutch 421, C2 clutch 422, B0 brake 316, B1 brake 431, B2 brake 432 and B3 brake 433 are applied hydraulic frictional engagement devices which are generally used in a conventional automatic transmission for vehicle. Examples thereof are a wet multiple-plate type in which a plurality of frictional plates overlapped with each other is pressed by a hydraulic actuator, and a band brake in which an end of one or two bands wound around an outer peripheral surface of a rotating drum is fastened by the hydraulic actuator. These components are provided so as to selectively couple the members between which they are provided.

By the engagement of the engagement elements of first shift portion 300 and second shift portion 400 in the combinations shown in the operation table of FIG. 3, switching between a continuous shift state and a stepwise shift state, and selection of five forward gears of first to fifth gears are performed in transmission 200.

When C0 clutch 314 and B0 brake 316 are in a disengaged state, the relative rotation of sun gear 322, carrier 326 and ring gear 328 is permitted. In such a state, power split device 310 functions as the continuously variable transmission. In other words, transmission 200 is in the continuous shift state.

On the other hand, when C0 clutch 314 is in an engaged state, sun gear 322, carrier 326 and ring gear 328 are integrally engaged and the relative rotation of the gears is prohibited. In this state, power split device 310 is in a locked state where the three gears integrally rotate and the differential action is disabled. Therefore, power split device 310 does not function as the continuously variable transmission. In other words, power split device 310 is in the stepwise shift state wherein the gear ratio changes stepwise in transmission 200.

When B0 brake 316 is in an engaged state, sun gear 322 is fixed to case 202. In this state also, power split device 310 does not function as a continuously variable transmission. That is, transmission 200 enters a stepwise shift state.

As shown in FIG. 3, in transmission 200 in the stepwise shift state where C0 clutch 314 or B0 brake 316 are engaged, in first gear (1ST), by the engagement of C0 clutch 314, C1 clutch 421 and B3 brake 433, the maximum gear ratio of, for example, about "3.357" is attained. By the engagement of C0 clutch 314, C1 clutch 421 and B2 brake 432, second gear (2ND) where the gear ratio is smaller than in first gear (1ST), e.g., about "2.180", is established.

Similarly, in transmission 200 in a stepwise shift state, by the engagement of C0 clutch 314, C1 clutch 421 and B1 brake 431, third gear (3RD) where the gear ratio is smaller than in second gear (2ND), e.g., about "1.424", is established. By the engagement of C0 clutch 314, C1 clutch 421 and C2 clutch 422, fourth gear (4TH) where the gear ratio is smaller than in third gear (3RD), e.g., about "1.000", is established. By the engagement of C1 clutch 421, C2 clutch 422, and B0 brake 316, fifth gear (5TH) where the gear ratio is smaller than in fourth gear (4TH), e.g., about "0.705", is established.

By the engagement of C2 clutch 422 and B3 brake 433, reverse gear (R) where the gear ratio is an intermediate value between first gear (1ST) and second gear (2ND), e.g., about "3.209", is established.

On the other hand, in transmission 200 in a continuous shift state where C0 clutch 314 and B0 brake 316 are disengaged, first shift portion 300 functions as a continuous shift mechanism, and second shift portion 400 serially connected to first shift portion 300 functions as a stepwise transmission in which one of first to fifth gears is selected in accordance with the operation table of FIG. 3. That is, for the gear (one of first to fifth gears) of second shift portion 400, an input shaft rotation speed NI of second shift portion 400, that is, the rotation speed of transmission member 206, is continuously varied, whereby a gear ratio width can be obtained for each of the gears continuously. Thus, the gear ratio that is continuously variable without steps between each of the gears is obtained, whereby the total gear ratio for the whole transmission 200 can be obtained in a continuous manner.

When P (Parking) position or N (Neutral) position is selected by shift operation portion 804, all the engagement elements are brought into a disengaged state. Accordingly, transmission 200 enters a state where it cannot transmit torque to wheels. In this state, transmission member 206 is not engaged with any of the elements in second shift portion 400, and ring gear 328 is free with no engagement. In other words, a reaction force of the driving force outputted from engine 100 cannot be received by ring gear 328.

Figure 4:
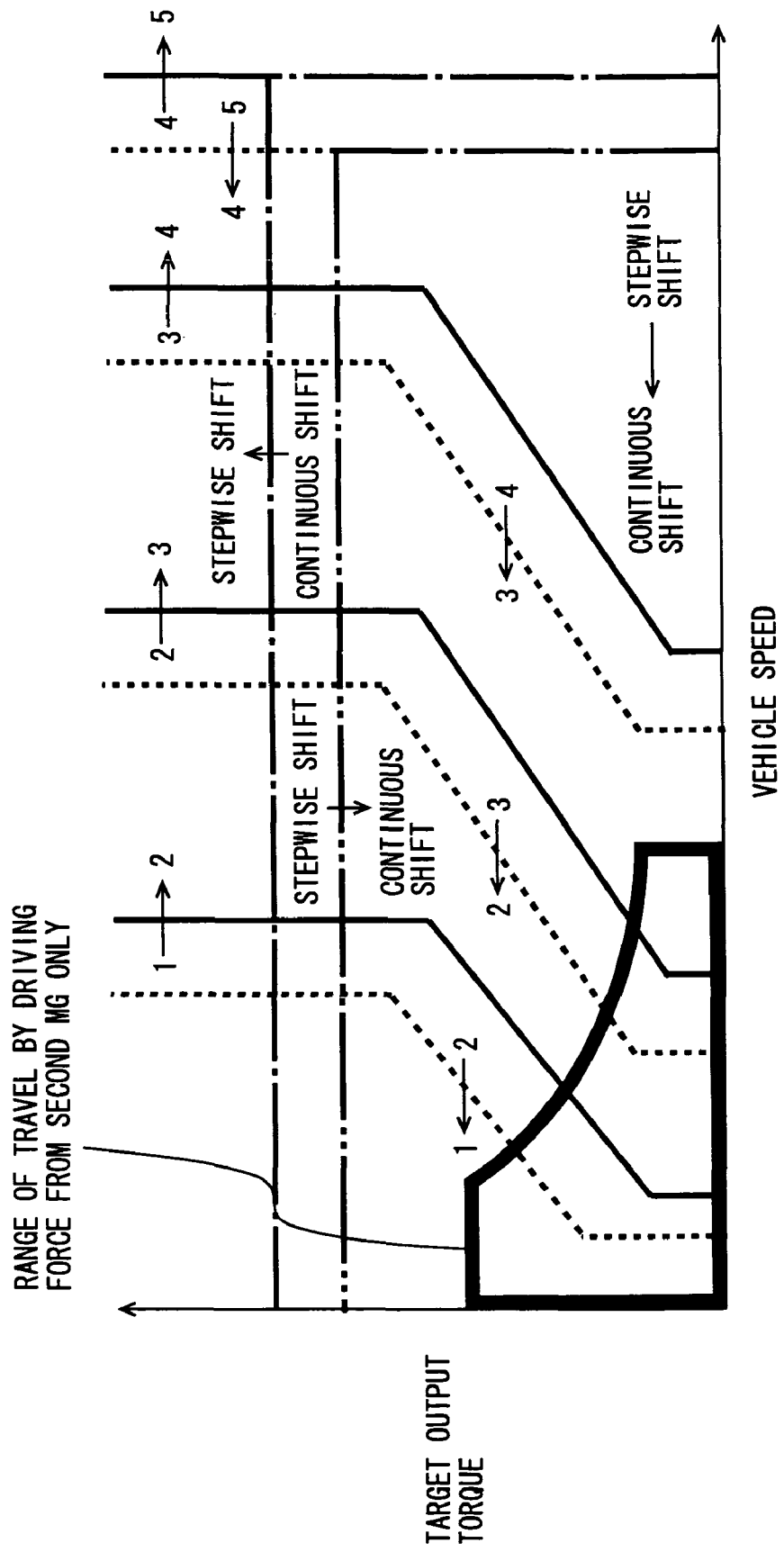
FIG. 4 is a shift map.

Shift (including switching between a continuous shift state and a stepwise shift state) in transmission 200 is automatically controlled based on the shift map shown in FIG. 4, for example. The shift map in the present embodiment is determined with the parameters of target output torque calculated from accelerator pedal position and/or vehicle speed, and the vehicle speed. It is to be noted that parameters of a shift map are not limited thereto.

In FIG. 4, the solid line represents the up-shift line, and the dashed line represents the down-shift line. The range enclosed by the bold solid line in FIG. 4 represents a range where the vehicle travels using only the driving force of second MG 312 and without using the driving force of engine 100. The alternate long and short dash line in FIG. 4 is a switch line for switching from the continuous shift state to the stepwise shift state. The alternate long and two short dashes line in FIG. 4 is a switch line for switching from the stepwise shift state to the continuous shift state. As understood from FIG. 4, transmission 200 is switched to the stepwise shift state in a relatively high-load region and/or a relatively high-vehicle speed region.

Description of Motor Generator Control System

Figure 5:
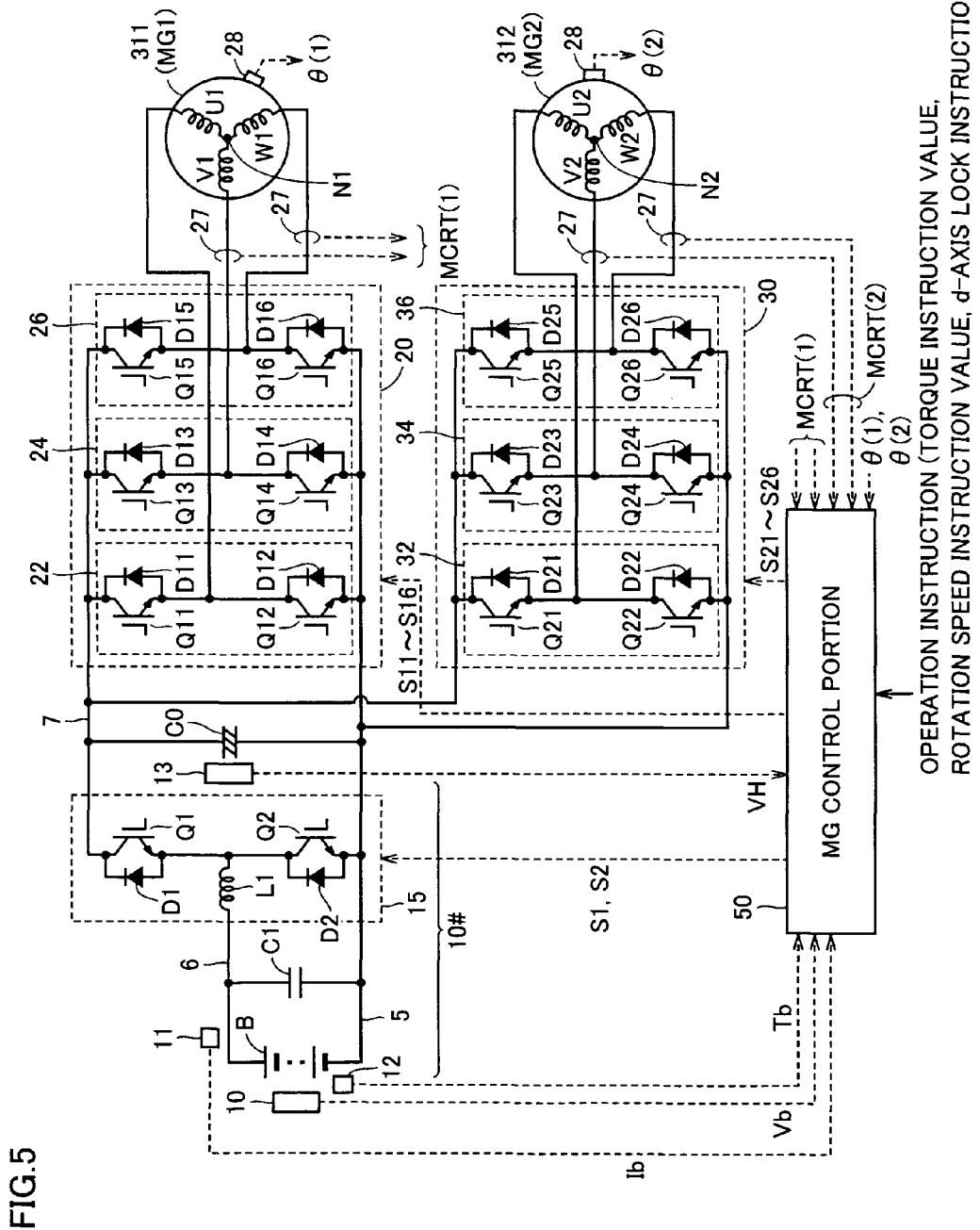
FIG. 5 is a circuit diagram illustrating a control structure of a motor generator.

Next, referring to FIG. 5, control structures of first MG (MG1) 311 and second MG (MG2) 312 are simply described.

Referring to FIG. 5, a direct-current voltage generator 10#, a smoothening capacitor C0, inverters 20 and 30, and an MG control portion 50 are provided in order to drive the first MG 311 (MG1) and the second MG 312 (MG2).

As shown in FIG. 2, first MG 311 is adapted to have both of functions of an electric motor and a power generator so that it can be operated as a power generator driven by engine 100 and as an electric motor which starts engine 100 via power split device 310 (differential mechanism) as shown in FIG. 2. In a similar manner, second MG 312 is incorporated in power train 1000 in order to generate the vehicle driving force. Further, second MG 312 is adapted to have both of the functions of the electric motor and power generator so as to realize the regeneration by generating an output torque in a direction reverse to a direction where wheels 700 are rotated.

Direct-current voltage generator 10# includes a traveling-use battery B, a smoothening capacitor C1 and a voltage step up/down converter 15. As the traveling-use battery B is applicable a secondary battery such as nickel hydrogen or lithium ions. Below is described a case where the traveling-use battery B, for which the secondary battery is used, is used as a direct-current power supply in the present embodiment. However, an electric storage device such as an electric double layer capacitor can be used in place of the traveling-use battery B.

A battery voltage Vb outputted from the traveling-use battery B is detected by a voltage sensor 10, and a battery current Ib inputted to and outputted from the traveling-use battery B is detected by a current sensor 11. Further, the traveling-use battery B is provided with a temperature sensor 12. Because of the possibility that the temperature of the traveling-use battery B may be locally different, more than one temperature sensor 12 may be provided at a plurality of positions in the traveling-use battery B. The battery voltage Vb, battery current Ib and battery temperature Tb detected by voltage sensor 10, current sensor 11 and temperature sensor 12 are outputted to MG control portion 50.

Smoothening capacitor C1 is connected to between a ground line 5 and a power supply line 6. Between a positive electrode of the traveling-use battery B and power supply line 6 and between a negative electrode of the traveling-use battery B and ground line 5 is provided a relay (not shown) which is turned on when the vehicle is traveling and turned off when the driving of vehicle is halted.

Voltage step-up/down converter 15 (hereinafter, may be simply referred to as converter) includes a reactor L1 and power semiconductor elements Q1 and Q2 which are switchingly controlled (hereinafter, referred to as "switching elements"). Reactor L1 is connected to between connection nodes of switching elements Q1 and Q2 and power supply line 6. Smoothening capacitor C0 is connected to between a power supply line 7 and ground line 5. Voltage sensor 13 detects a voltage VH between electrodes of smoothening capacitor C0 and transmits it to MG control portion 50.

Semiconductor switching elements Q1 and Q2 for electric power are connected in series between power supply line 7 and ground line 5. Semiconductor switching elements Q1 and Q2 for electric power are turned on and off by switching control signals S1 and S2 from MG control portion 50.

As the switching element can be used IGBT (Insulted Gate Bipolar Transistor), a power MOS (Metal Oxide Semiconductor) transistor, a power bipolar transistor or the like. In switching elements Q1 and Q2, anti-parallel diodes D1 and D2 are provided.

A direct-current voltage side of inverters 20 and 30 is connected to converter 15 via common ground line 5 and power supply line 7. Inverter 20 includes a U-phase arm 22, a V-phase arm 24 and a W-phase arm 26 which are provided in parallel between power supply line 7 and ground line 5. The respective phase arms include switching elements connected in series between power supply line 7 and ground line 5. For example, U-phase arm 22 includes switching elements Q11 and Q12, V-phase arm 24 includes switching elements Q13 and Q14, and W-phase arm 26 includes switching elements Q15 and Q16. To switching elements Q11-Q16 are respectively connected anti-parallel diodes D11-D16. The ON and OFF of switching elements Q11-Q16 are controlled by switching control signals S11-S16 from MG control portion 50.

First MG 311 includes a U-phase coil winding U1, a V-phase coil winding V1, a W-phase coil winding W1 provided in a stator and a rotor not shown. One ends of U-phase coil winding U1, V-phase coil winding V1 and W-phase coil winding W1 are connected to one another at an intermediate point N1, while another ends thereof are respectively connected to U-phase arm 22, V-phase arm 24 and W-phase arm 26 of inverter 20. Inverter 20 controls the ON and OFF of switching elements Q11-Q16 (switching control) in response to switching control signals S11-S16 from MG control portion 50 to thereby execute a bidirectional power conversion between direct-current voltage generator 10# and first MG 311.

More specifically, inverter 20, based on the switching control by MG control portion 50, can convert a direct-current voltage received from power supply line 7 into a three-phase AC voltage and output the converted three-phase AC voltage to first MG 311. Accordingly, first MG 311 is driven so as to generate a designated torque. Further, inverter 20 can convert the three-phase AC voltage generated by first MG 311 in response to the output of engine 110 into a direct-current voltage in accordance with the switching control by MG control portion 50 and output the converted direct-current voltage to power supply line 7.

Inverter 30, which is constituted in a manner similar to the inverter 20, includes switching elements Q21-Q26 which turned on and off by switching control signals S21-S26 and anti-parallel diodes D21-D26.

Second MG 312, which is constituted in a manner similar to first MG 311, includes a U-phase coil winding U2, a V-phase coil winding V2, a W-phase coil winding W2 provided in a stator and a rotor not shown. In a manner similar to first MG 311, one ends of U-phase coil winding U2, V-phase coil winding V2 and W-phase coil winding W2 are connected to one another at an intermediate point N2, while another ends thereof are respectively connected to U-phase arm 32, V-phase arm 34 and W-phase arm 36 of inverter 30.

Inverter 30 controls the ON and OFF (switching control) of switching elements Q21-Q26 in response to switching control signals S21-S26 from MG control portion 50 to thereby execute a bidirectional power conversion between direct-current voltage generator 10# and second MG 312.

More specifically, inverter 30, based on the switching control by MG control portion, can convert the direct-current voltage received from power supply line 7 into the three-phase AC voltage and output the converted three-phase AC voltage to second MG 312. Accordingly, second MG 312 is driven so as to generate a designated torque. Further, inverter 30 can convert the three-phase AC voltage generated by second MG 312 in response to the torque from wheels 700 at the time of the regenerative braking of the vehicle into a direct-current voltage in accordance with the switching control by MG control portion 50 and output the converted direct-current voltage to power supply line 7.

The regenerative braking mentioned above includes the braking including the regeneration when a foot brake is operated by a driver who is driving the hybrid vehicle, and the deceleration of the vehicle (or halt of acceleration) while the power is regenerated in such a manner that an acceleration pedal is released when the vehicle is traveling without the operation of the foot brake.

First MG 311 and second MG 312 are each provided with a current sensor 27 and a rotation angle sensor (resolver) 28. Because the sum of instantaneous values of three-phase currents iu, iv and iw is zero, current sensor 27 may be provided so that the motor currents for two phases (for example, V-phase current iv and W-phase current iw) are detected as shown in FIG. 1. Rotation angle sensor 28 detects rotation angles $\theta$ of the rotors, not shown, of first MG (MG1) 311 and MG2 and transmits the detected rotation angles $\theta$ to MG control portion 50. MG control portion 50 can calculate rotation speed Nmt (or rotation angular velocities $\omega$) of the first MG 311 and MG2 based on the rotation angles $\theta$.

A motor current MCRT (1) and rotor rotation angle $\theta$ (1) of first MG 311 and a motor current MCRT (2) and rotor rotation angle $\theta$ (2) of second MG 312, which are detected by these sensors, are inputted to MG control portion 50.

MG control portion 50 is realized when ECU 800 executes the program previously recorded therein, and controls the power supply (typically, motor current control) to first MG 311 and second MG 312 so that first MG 311 and second MG 312 are operated in accordance with respective operation instructions (torque instruction value, rotation speed instruction value, lock instruction and the like). More specifically, MG control portion 50 generates switching control signals S1, S2, S11-S16 and S21-S26 of converter 15 and inverters 20 and 30 in order to realize the control of power supply as described above.

Description of Idle Speed Control and Learning Control Thereof

Next, the idle speed control (ISC) of the engine and the learning control thereof in the power train according to the present embodiment are described.

Figure 6:
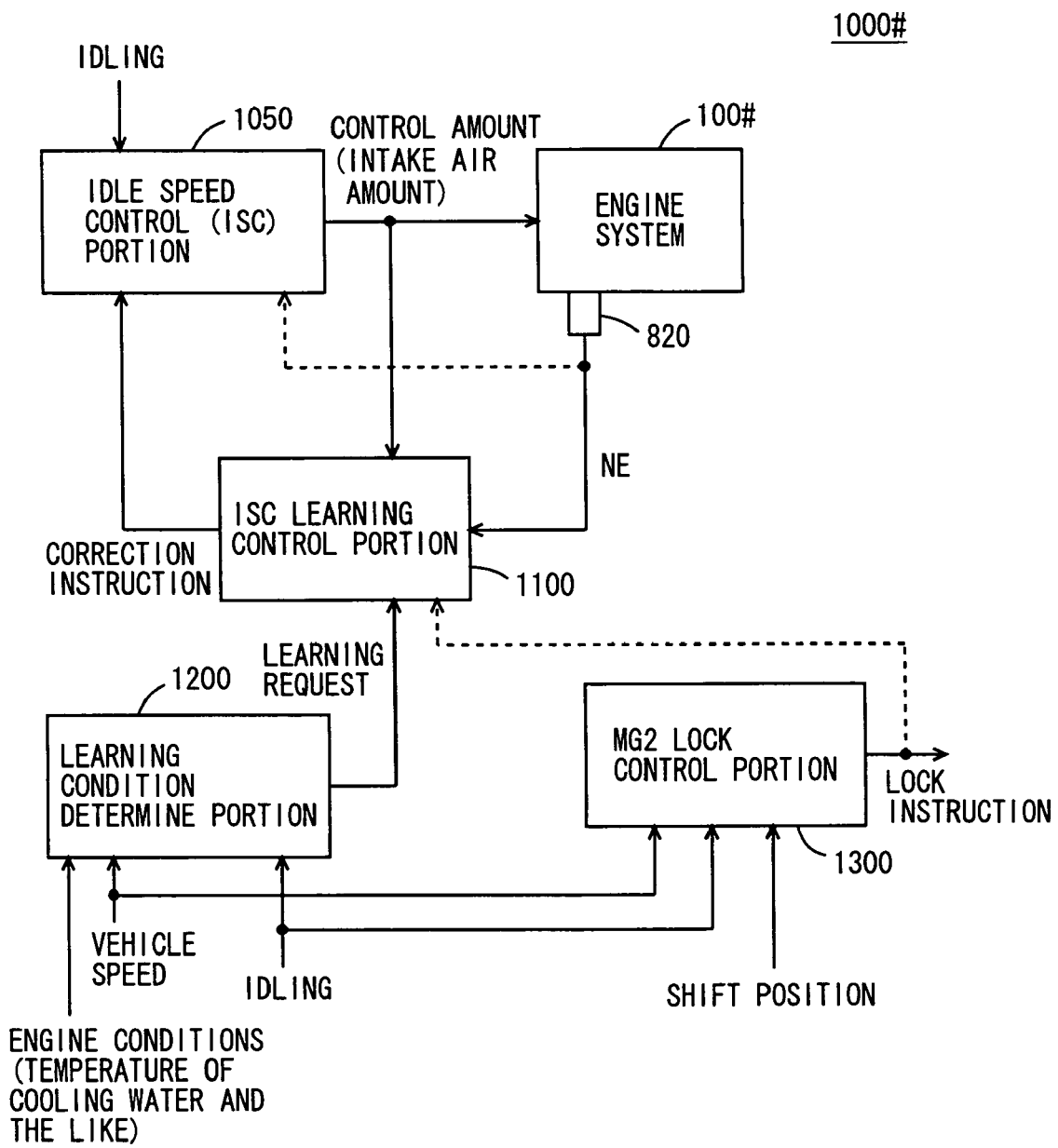
FIG. 6 is a schematic block diagram for describing the ISC and a learning control thereof in the power train according to the embodiment of the present invention.

FIG. 6 is a schematic block diagram for describing the idle speed control (ISC) and the learning control thereof (ISC learning) in the power train according to the present embodiment.

Referring to FIG. 6, an ISC-system 1000# includes an ISC portion 1050, an ISC learning control portion 1100, a leaning condition determine portion 1200 and an MG2 lock control portion 1300.

ISC portion 1050 controls an engine system 100# so that the engine rotation speed reaches a targeted rotation speed in the idle operation. Engine system 100# is a collective designation for engine 100 and such attached components as injector 102, throttle valve 816 shown in FIG. 1.

ISC portion 1050 typically controls an intake air amount of engine system 100# in order to realize the engine control described earlier. The intake air amount is controlled through the control of the position of electronic throttle valve 816. In the case where a lifting amount adjustable mechanism is provided in an intake valve (not shown) of engine 100, the intake air amount is controlled through the control of the lifting amount of the intake valve. Alternatively, in the case where engine 100 is a diesel engine or the like, the idle speed may be controlled through the control of a fuel amount injected from injector 102.

According to the present embodiment, ISC portion 1050 sets an intake air amount Aid during the idle operation as a set amount by the ISC (also referred to as "ISC set amount") in accordance with the following formula (1).

$$Aid = Ab + Ac + Afb \quad (1)$$

In the formula (1), the air basic amount Ab is set to an air amount necessary for maintaining the engine rotation speed to a targeted idle speed (when the engine is warm) in a stable condition when the engine is warm. The air corrected amount Ac is an increased amount of the basic air amount Ab on which differences between the stable speed condition and current conditions are reflected. As a typical example of the air corrected amount Ac is set an air increased amount necessary for maintaining the engine rotation speed to a targeted idle speed (when the engine is cold) when the engine is cold, an air increased amount for using external loads (air conditioner, headlight and the like) or an air changed amount set when the shift position is switched (N→D, D→N) or the like.

The feedback air amount Afb is set so that a difference between an actual engine rotation speed NE detected by engine rotation speed sensor 820 and the targeted idle speed is compensated by the feedback control (for example, PI control). In general, the targeted idle speed when the engine is cold is set to be higher than the targeted idle speed when the engine is hot in order to reduce the emission reduction and warm up the engine.

ISC learning control portion 1100 changes the set air amount in the formula (1) based on a difference between the actual engine rotation speed during the ISC and the targeted idle speed in response to the learning request from learning condition determine portion 1200. Typically, when the ISC learning is executed when the engine is hot, the basic air amount Ab is corrected to have an appropriate value.

Learning condition determine portion 1200 generates the learning request based on conditions of the engine and an ISC learning actual result (success or failure of the learning, learned values and the like) during the idle operation wherein engine 100 is controlled by ISC portion 1050. For example, in order to learn the basic air amount Ab, the learning request is generated when the engine is warm, in other words, when the engine cooling water is at a predetermined temperature or above. In general, the ISC learning is implemented during the idle operation when vehicle is stopped.

Figure 7:
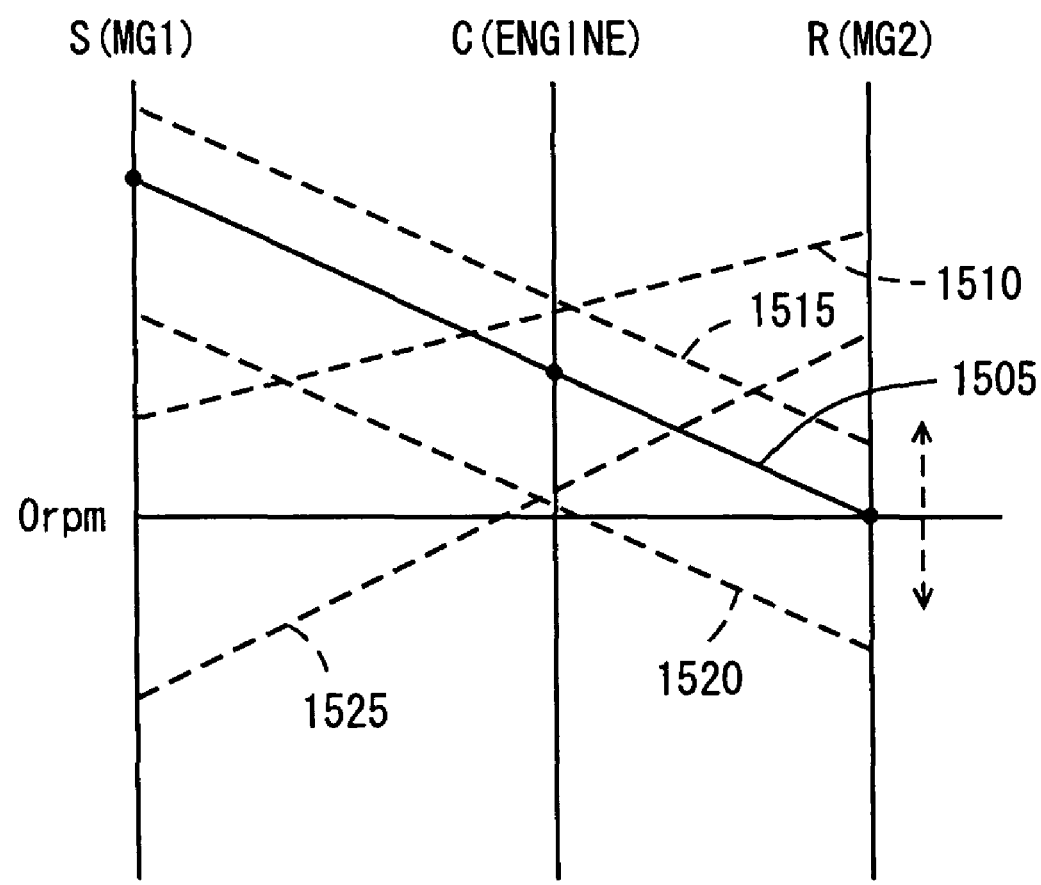
FIG. 7 is a collinear graph illustrating a differential operation of a power split device during an idle operation.

Referring to FIG. 7, a straight line 1505 shown by a solid line is a collinear line in power split device 310 when the shift position in which transmission member 206 is engaged with any of the elements in second shift portion 400 is selected. At the time, in power split device 310, engine 100 is idly operated by the ISC with ring gear 328 being secured (rotation speed=0). Therefore, the behavior of the rotation speed of carrier 326 is stable, and the rotation speed in accordance with the ISC set amount is obtained.

Accordingly, the learning control for correcting the ISC set amount is implemented so that the intake air amount is reduced when the actual engine rotation speed during the ISC is too high in comparison to the targeted idle speed and the intake air amount during the idle operation thereafter is increased when the actual engine rotation speed is too low in comparison to the targeted idle speed. As a result, the ISC control can be optimized, and the engine rotation speed in the idle operation can be stably controlled.

In contrast, when the N position or the P position is selected and transmission member 206 becomes free in second shift portion 400, ring gear 328 is free with no engagement, and engine 100 is idly operated with the rotation speed of ring gear 328 being destabilized as shown in the collinear lines 1510, 1515, 1520 and 1525 shown by dotted lines. At the time, the behavior of the engine rotation speed becomes unstable, and the engine rotation speed goes up and down in accordance with the rotation speed of ring gear 328 though the ISC set amount is not any different.

Therefore, when the ISC learning is executed in the state shown by the collinear lines 1505 and 1515, such a wrong determination that the idle speed is too high is made, and the basic air amount Ab is reduced in the learning during the next idle operation. Accordingly, when engine 100 is idly operated the next time in the normal state (collinear line 1505), the engine rotation speed is reduced, and the engine stall may possibly occur when engine rotation speed is significantly reduced.

When the ISC learning is executed as shown in the collinear lines 1520 and 1525, such a wrong determination that the idle speed is too low is made, and the basic air amount Ab is increased in the learning during the next idle operation. Accordingly, when engine 100 is idly operated the next time in the normal state (collinear line 1505), the engine rotation speed may be excessively increased.

Therefore, in the power train control device according to the present embodiment, the following control operation is executed in order to appropriately execute the ISC learning when the predetermined position (N position, P position) in which transmission member 206 is free with no engagement in second shift portion 400 is selected. In the description below, the predetermined position is referred to as "release position". In the present embodiment, the release position is a collective designation for the N position and the P position.

Referring to FIG. 6 again, MG2 lock control portion 1300 generates the lock instruction for locking the rotor of second MG (MG2) 312 by the electromagnetic force during the idle operation of the stopped vehicle wherein the release position is selected.

Operation of the MG control portion 50 (FIG. 5) when the lock instruction is generated by MG2 lock control portion 1300 is described.

As shown in FIG. 5, MG control portion 50 can execute the feedback control of the respective phase currents MCRT (2) of second MG (MG2) 312. The respective phase currents iu, iv and iw of the motor generator, which is a three-phase synchronous electric machine, are associated with a d-axis current id and a q-axis current iq according to the following coordinate conversion formula shown in (2) in which a magnetic pole position (rotor rotation angle) $\theta$ is used.

$$\begin{pmatrix} id \\ iq \end{pmatrix} = \sqrt{\frac{2}{3}} \begin{pmatrix} \cos\theta & \sin\theta \\ -\sin\theta & \cos\theta \end{pmatrix} \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} iu \\ iv \\ iw \end{pmatrix} \quad (2)$$

Further, a voltage equation of the three-phase synchronous electric machine in the d-q axis coordinate system is shown in (3). In the formula (3), s denotes the Laplace operator, and $\phi$ denotes the magnetic flux.

$$\begin{pmatrix} vd \\ vq \end{pmatrix} = \begin{pmatrix} r+sLd & -\omega Lq \\ \omega Ld & r+sLq \end{pmatrix} \begin{pmatrix} id \\ iq \end{pmatrix} + \begin{pmatrix} 0 \\ \omega \Phi \end{pmatrix} \quad (3)$$

Further, a torque T generated by the three-phase synchronous electric machine is shown in the formula (4). In the formula (4), p denotes the number of paired poles.

$$T=P\{\Phi iq+(Ld-Lq)idiq\} \quad (4)$$

For example, provided that the q-axis current iq=0 and only the d-axis current id is supplied in the d-q axis coordinate system, the motor generator does not generate the torque, and the power supply to the motor generator can be controlled so that a permanent magnetic attached to the rotor of the motor generator can be locked by a magnetic field generated in the stator. In the present embodiment, the method of locking the rotation of the rotor of second MG 312 by the electromagnetic force according to the control of power supply thus described is referred to as "d-axis lock". For confirmation, the rotation of the rotor of second MG 312 can be secured by the electromagnetic force according to a different control method. Lock control (MG2 lock control) of second MG 312 thus described allows the rotation of ring gear 328 in the free sate to be secured.

ISC learning control portion 1100 executes the ISC learning during the d-axis lock of second MG 312 in response to the lock instruction by MG lock control portion 1300. Accordingly, the ISC learning can be executed in the state as shown in the collinear line 1505 of FIG. 7.

Figure 8:
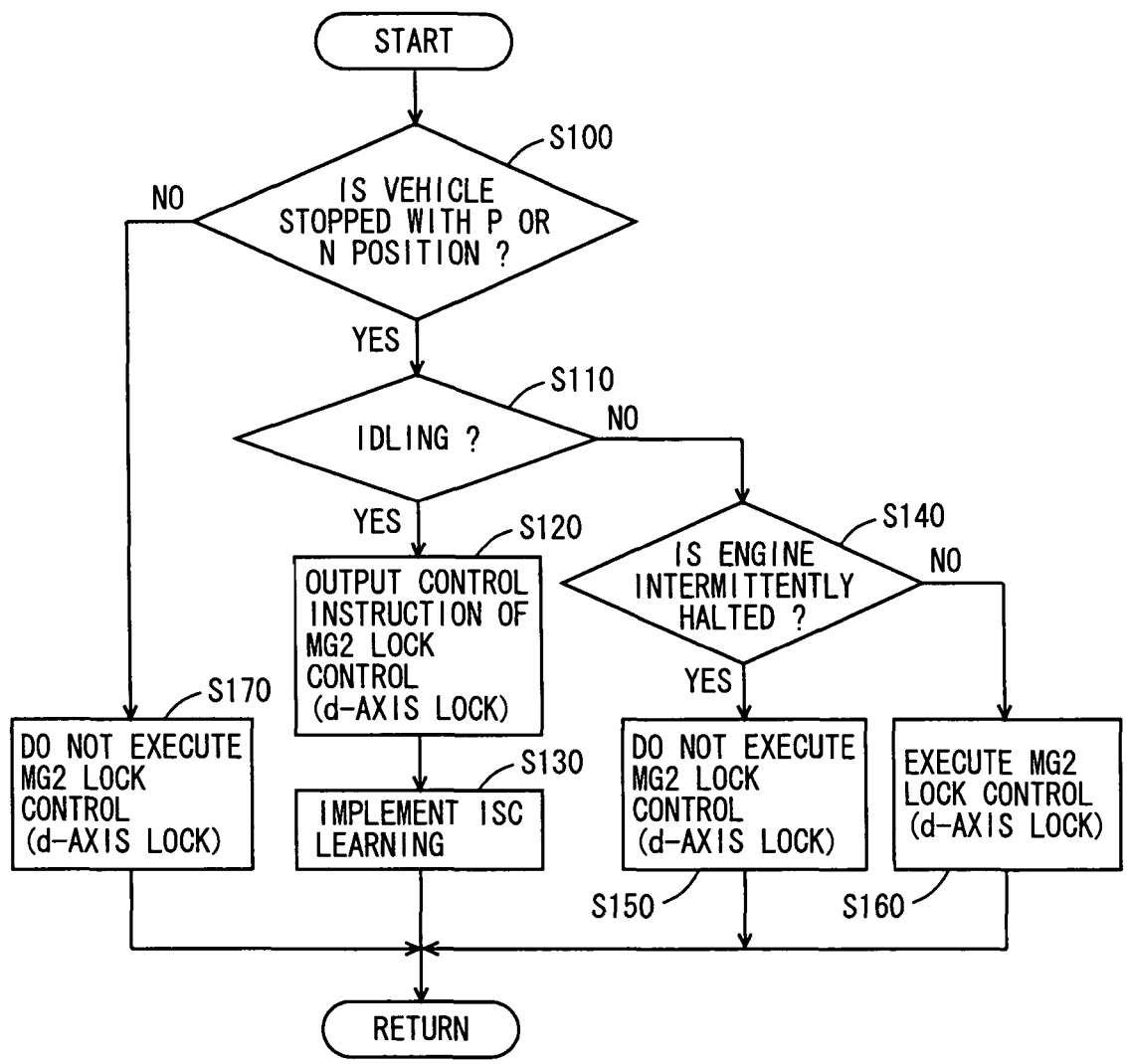
FIG. 8 is a flow chart for describing the implementation control of d-axis lock in the power train according to the embodiment of the present invention.

FIG. 8 is a flow chart for describing the implementation control of the d-axis lock in the power train according to the present embodiment. The control processing in accordance with the flow chart shown in FIG. 8 corresponds to the function of MG2 lock control portion 1300 shown in FIG. 6 and is realized by execution of predetermined program previously stored in ECU 800, at a predetermined cycle.

Referring to FIG. 8, ECU 800 determines in Step 100 whether or not the vehicle is stopped and the P position or N position (release position) in which ring gear 328 is free with no engagement is selected. The ECU 800 further determines in Step S110 whether it is in idle state or not, when the determination of Step 100 shows YES.

Then, ECU 800 outputs the control instruction (lock instruction shown in FIG. 6) for executing the MG2 lock control (d-axis lock), in Step S120, when the determination of Step S110 shows YES, in other words, when the ISC is being implemented. In response to the output, MG control portion 50 controls the power supply so that the rotor of second MG (MG2) 312 is subjected to d-axis lock.

Further, in Step S130, ECU 800 executes the ISC learning in the state where the MG2 lock control is executed, in other words, after the state as shown in the collinear line 1505 in FIG. 7 is realized. Accordingly, the set amount (air amount) in the formula (1) is corrected whenever necessary based on the actual idle speed during the execution of the ISC.

Figure 9:
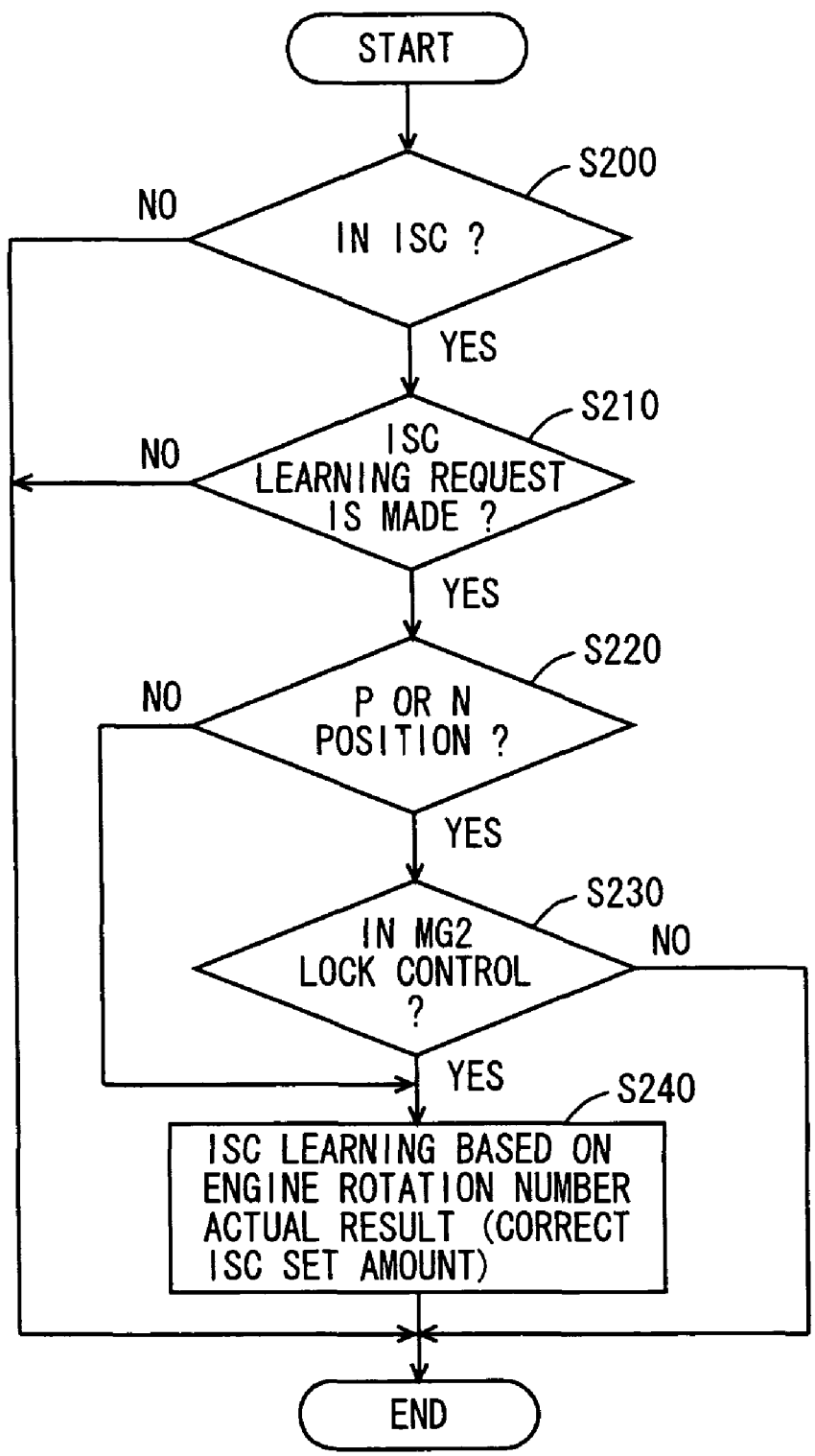
FIG. 9 is a flow chart for describing the implementation control of the ISC learning.

FIG. 9 is a flow chart for describing the implementation control of the ISC learning. The control processing in accordance with the flow chart shown in FIG. 9 is also realized by execution of the predetermined program previously stored in ECU 800, at a predetermined cycle.

Referring to FIG. 9, ECU 800 determines in Step S220 whether or not the release position (P position or N position) is selected in the case where the ISC learning is requested when the ISC is being executed (when the determinations of S200 and S210 both show YES). When the determination of Step S200 shows NO (ISC is not executed) or when the determination of Step S210 shows NO (ISC learning is not requested), the control processing is terminated without the implementation of the ISC learning.

When the release position is selected (determined as YES in S220), it is determined whether or not the MG2 lock control is being executed, in Step S230. The determination of S230 is made depending on whether or not the lock instruction by MG2 lock control portion 1300 is generated.

Then, ECU 800 executes, in Step S240, the ISC learning based on the actual engine rotation speed according to the current ISC set amount in the case where second MG 312 is being locked based on the lock instruction. When it is added to the conditions for completing the learning that the rotation speed of ring gear 328 is substantially zero in the MG2 lock state, the ISC learning can be executed in a stable manner. The rotation speed of ring gear 328 can be detected by the rotation speed sensor of second MG 312 or input shaft rotation speed sensor 822 provided in the input shaft (transmission member 206) of second shift portion 400.

ECU 800 skips Step S240 in the case where second MG 312 is not locked, and then terminates the processing. In other words, in any period other than the period when the MG2 lock control (d-axis lock) is executed, the implementation of the ISC learning is prohibited during the idle operation wherein the release position is selected.

In the case where any shift position other than the P position or N position (typically, D position) is selected when the ISC learning is requested, ECU 800 skips Step S230, and executes the ISC learning in Step S240 though second MG 312 is not subjected to the lock control.

Referring to FIG. 8 again, ECU 800 further determines whether or not engine 100 is intermittently halted, in Step S140, when it is not in idle state (determined as NO in S110).

During the operation of the engine (determined as NO in S140), engine 100 is operated for charging the battery, and therefore, the rotation speed of first MG 311 becomes unstable when the rotation speed of ring gear 328 changes, which may destabilize the power generation by first MG 311. Therefore, in Step S160, ECU 800 outputs a control instruction similar to that of Step S120 and executes the MG2 lock control (d-axis lock) so that the power generation by first MG 311 is not destabilized.

When the determination of Step S140 shows YES, in other words, when the engine is intermittently halted, and the determination of Step S100 shows NO, it is unnecessary to execute the MG2 lock control. Therefore, ECU 800 does not execute the MG2 lock control in Step S150 or Step S170.

With such a configuration, in the power train according to the present embodiment, transmission member 206 which couples power split device 310 and second shift portion 400 is free with no engagement, and the ISC learning can be executed with ring gear 328 continuously being engaged in such a manner that the rotor of second MG (MG2) 312 is locked by the electromagnetic force (d-axis lock) even when the release shift position (P position or N position) in which ring gear 328 is free with no engagement is selected. In other words, the ISC learning can be executed in the state where ring gear 328 is locked and the behavior of the engine rotation speed is stabilized. As a result, the ISC learning can be appropriately performed and the engine rotation speed during the idle operation can be appropriately set.

First Modification

Figure 10:
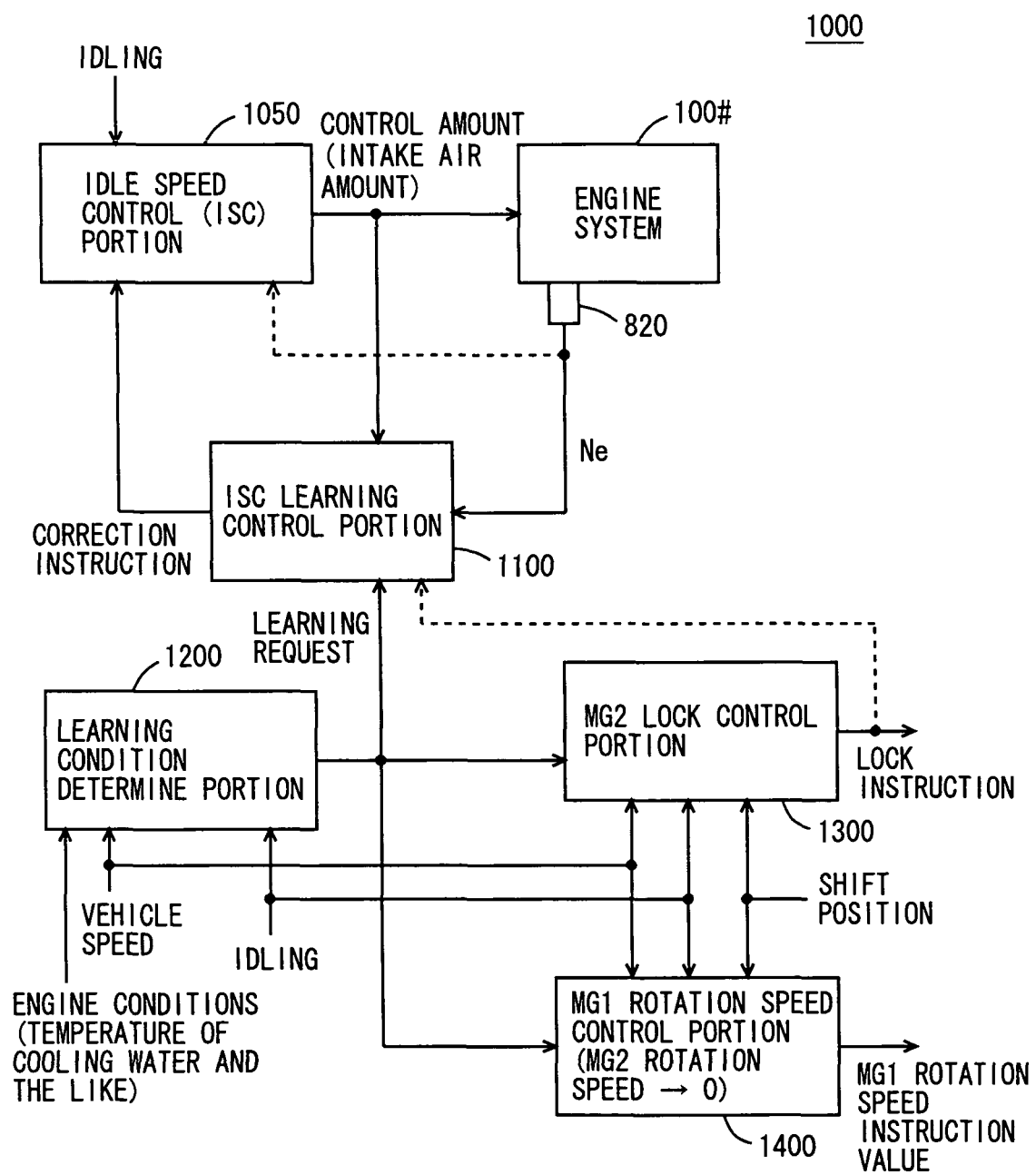
FIG. 10 is a schematic block diagram for describing the ISC and the ISC learning in the power train according to a first modification of the embodiment of the present invention.

FIG. 10 is a schematic block diagram for describing a first modification of the ISC and ISC in the power train according to the present embodiment.

As learnt when FIG. 10 is compared to FIG. 6, according to the first modification, MG2 lock control portion 1300 generates the lock instruction of second MG (MG2) 312 in response to the learning request from learning condition determine portion 1200. Further, an MG1 rotation speed control portion 1400 operated when the learning request is not generated during the idle operation wherein the release position is selected is further provided.

When the air basic amount Ab is the learning target as described earlier, for example, the ISC learning request is not generated during the idle operation when the engine cooling water is at the predetermined temperature or below. Thus, the ISC learning request may not be generated even in the idle operation wherein the release position is selected, in which case the d-axis lock of second MG (MG2) 312 is not always necessary.

Therefore, MG2 lock control portion 1300 generates the lock instruction of second MG (MG2) 312 when the learning request is generated by learning condition determine portion 1200 during the idle operation of the stopped vehicle wherein the release position is selected. More specifically, in the first modification, the lock instruction of second MG 312 is not generated when the ISC learning request is not generated during the stop of the vehicle wherein the release position is selected.

MG1 rotation speed control portion 1400 is operated when the ISC learning request is not generated during the stop of the vehicle wherein the release position is selected, and controls the rotation speed of first MG (MG2) 311 so that the rotation speed of second MG (MG2) 312, that is ring gear 328, is approximate to zero. As learnt from the collinear line 1505 shown in FIG. 7, the rotation speed of first MG (MG1) 311 in order to set the rotation speed of second MG (MG2) 312 to zero during the idle operation of engine 100 can be set in accordance with the product of the targeted value of the idle speed by the ISC and the predetermined gear ratio in power split device 310.

Therefore, according to the control structure shown in FIG. 10, MG1 rotation speed control portion 1400 does not generate the MG2 lock instruction until the learning request is generated by learning condition determine portion 1200 though the conditions for executing the MG2 lock control are satisfied in the control structure shown in FIG. 6. Then, when the power supply to first MG 311 is controlled by MG control portion 50 in accordance with an MG1 rotation speed instruction value set by MG1 rotation speed control portion 1400, the rotation speed of second MG 312 is approximate to zero though the rotor thereof is not locked by the electromagnetic force.

When the ISC learning request is generated by learning condition determine portion 1200 after the learning conditions are satisfied when, for example, the temperature of the engine cooling water is increased, the control of the rotation speed by MG1 rotation speed control portion 1400 is halted, and the lock instruction of second MG (MG2) 312 is generated by MG2 lock control portion 1300.

Figure 11:
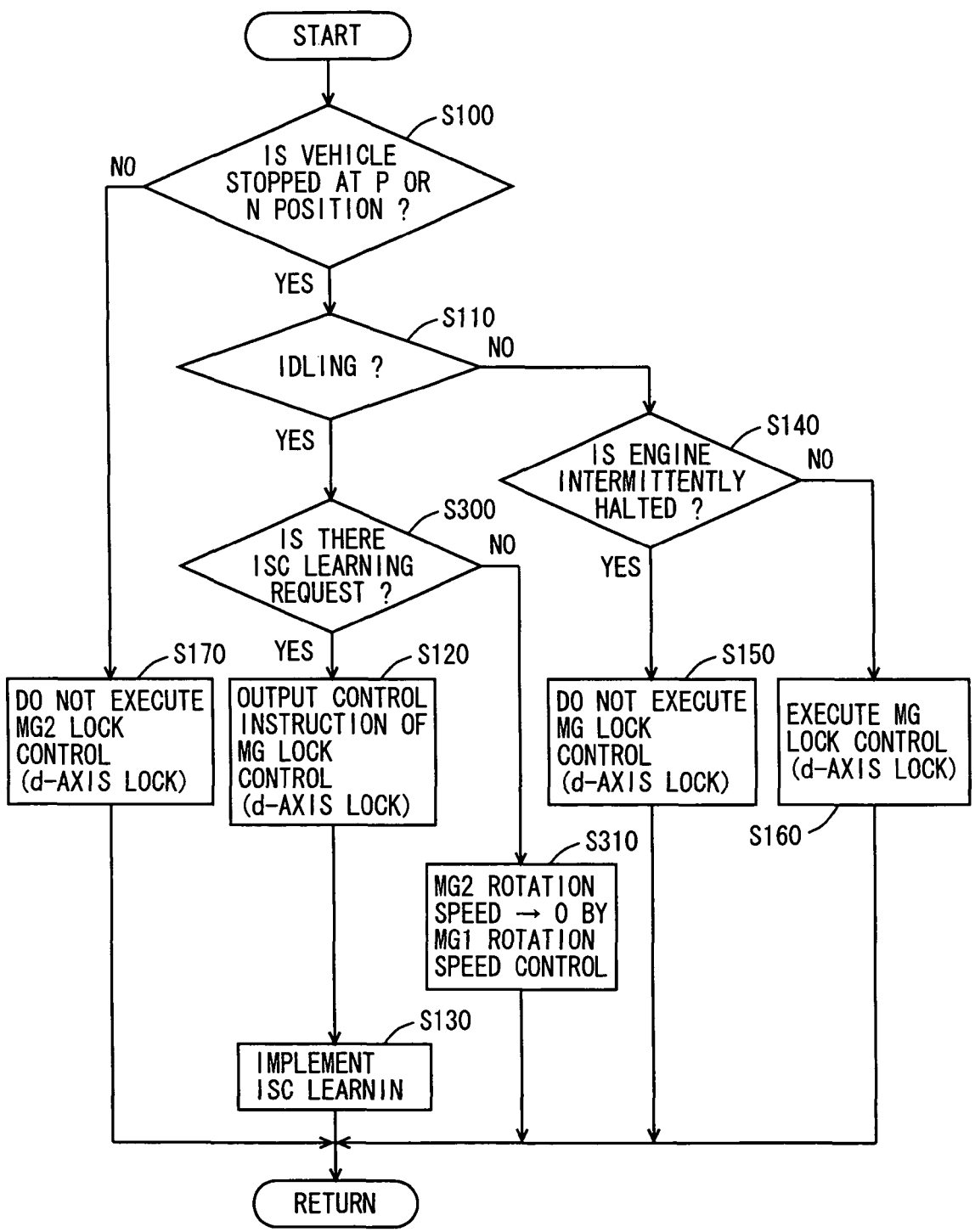
FIG. 11 is a flow chart for describing the implementation control of d-axis lock according to the first modification.

FIG. 11 is a flow chart for describing the implementation control of the d-axis lock according to the first modification. The control processing in accordance with the flow chart shown in FIG. 11 corresponds to the function of MG2 lock control portion 1300 shown in FIG. 10, and is realized by execution of the predetermined program previously stored in ECU 800, at a predetermined cycle.

Comparing FIG. 11 to FIG. 8, in the first modification, ECU 800 further executes Step S300 in which it is determined whether or not the ISC learning request is generated when the determination of Step S110 shows YES, in other words, during the implementation of the ISC.

Then, in the case where the ISC learning request is generated (determined as YES in S300), ECU 800 implements Steps S120 and S130 in a manner similar to FIG. 8, and executes the d-axis lock to second MG (MG2) 312 so that the ISC learning is implemented.

In the case where the ISC learning request is not generated (determined as NO in S300), ECU 800 controls the rotation speed of first MG (MG1) 311 by MG1 rotation speed control portion 1400 shown in FIG. 10 in Step S310. As a result, the rotation speed of second MG (MG2) 312 is approximate to zero.

According to the first modification thus constituted, the reduction of the power consumption and the prevention of the temperature increase in second MG 312 can be realized because the MG2 lock control is not executed when the ISC learning request is not generated. Before the ISC learning request is generated, the rotation speed of second MG 312 can be approximate to zero by MG1 rotation speed control portion 1400. Therefore, ring gear 328 can be speedily locked when the ISC learning request is generated, and the ISC learning can be performed in a short period of time.

Second Modification

In a second modification is described a control structure for implementing the ISC learning when the vehicle is traveling and the N position is selected in order to support such a failure to appropriately obtain the opportunity of the ISC learning during the stop of the vehicle.

Figure 12:
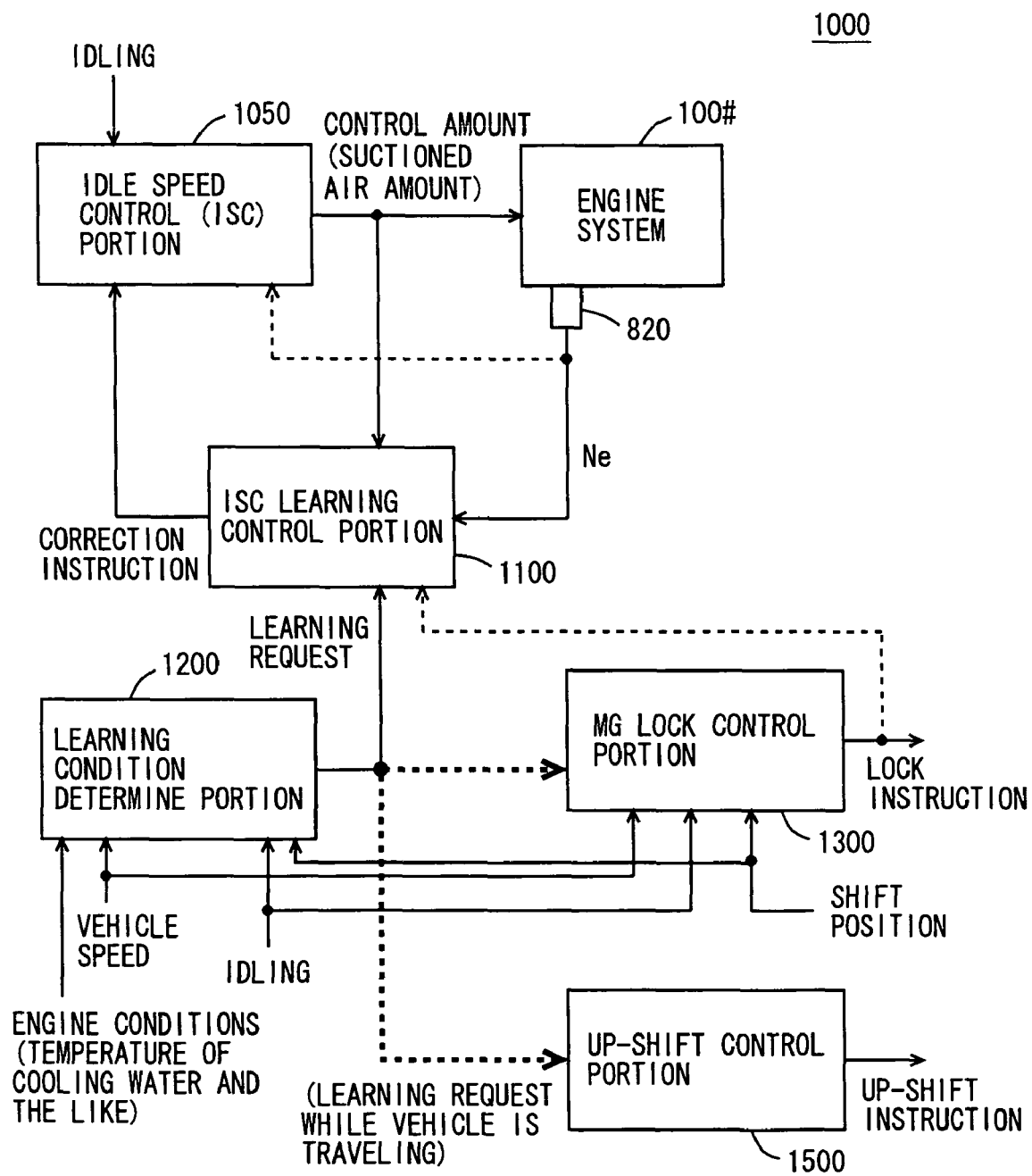
FIG. 12 is a schematic block diagram for describing the ISC and the ISC learning in the power train according to a second modification of the embodiment of the present invention.

As learnt by comparing FIG. 12 to FIG. 6, according to the second modification, an up-shift control portion 1500 is further provided in the control structure shown in FIG. 8. Further, MG2 lock control portion 1300 is operated in a manner similar to the description of FIG. 10, and generates the lock instruction of second MG (MG2) 312 in response to the learning request from learning condition determine portion 1200. Learning condition determine portion 1200 generates the ISC learning request when the other learning conditions are satisfied (temperature of cooling water is higher than predetermined temperature or the like) in the case where the shift position is the N position regardless of if the vehicle is stopped or traveling (vehicle speed >0).

Up-shift control portion 1500 instructs an up-shift instruction to second shift portion 400 when the ISC learning request by learning condition determine portion 1200 is inputted and the ISC learning request is generated when the N position is selected and the vehicle is traveling.

In second shift portion 400, the gear is switched to such a gear that has a gear ratio smaller than the current gear ratio so that the currently selected gear is up-shifted in response to the up-shift instruction by up-shift control portion 1500. More specifically, the disengagement/engagement of the respective frictional engagement elements of second shift portion 400 is appropriately switched for the up-shift in accordance with the operation table shown in FIG. 3.

Figure 13:
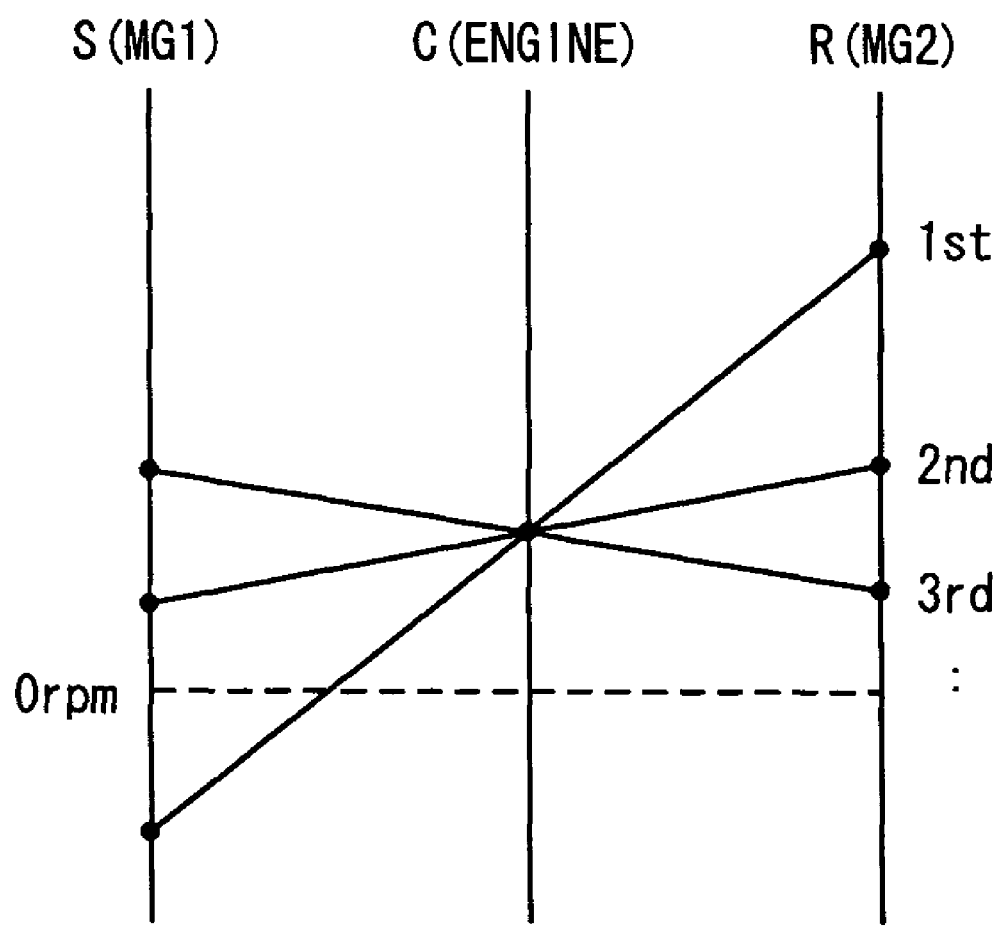
FIG. 13 is a drawing for describing the change in rotation speed of a ring gear with respect to a transmission gear in a second shift portion.

When the gear ratio of second shift portion 400 is up-shifted when the N position is selected as shown in FIG. 13, the rotation speed of transmission member 206 is reduced in accordance with the reduction of the gear ratio of second shift portion 400. More specifically, the up-shift in second shift portion 400 favorably results in the reduction of the rotation speed of ring gear 328 in power split device 310.

Therefore, in the case where the ISC learning is executed at the time of the selection of the N position when the vehicle is traveling, the up-shift control in second shift portion 400 and the MG2 lock control are both adopted. Accordingly, the rotation speed of ring gear 328 (MG2 rotation speed) can be speedily reduced, and ring gear 328 can be speedily locked. As a result, the ISC learning can be performed in a short period of time.

Figure 14:
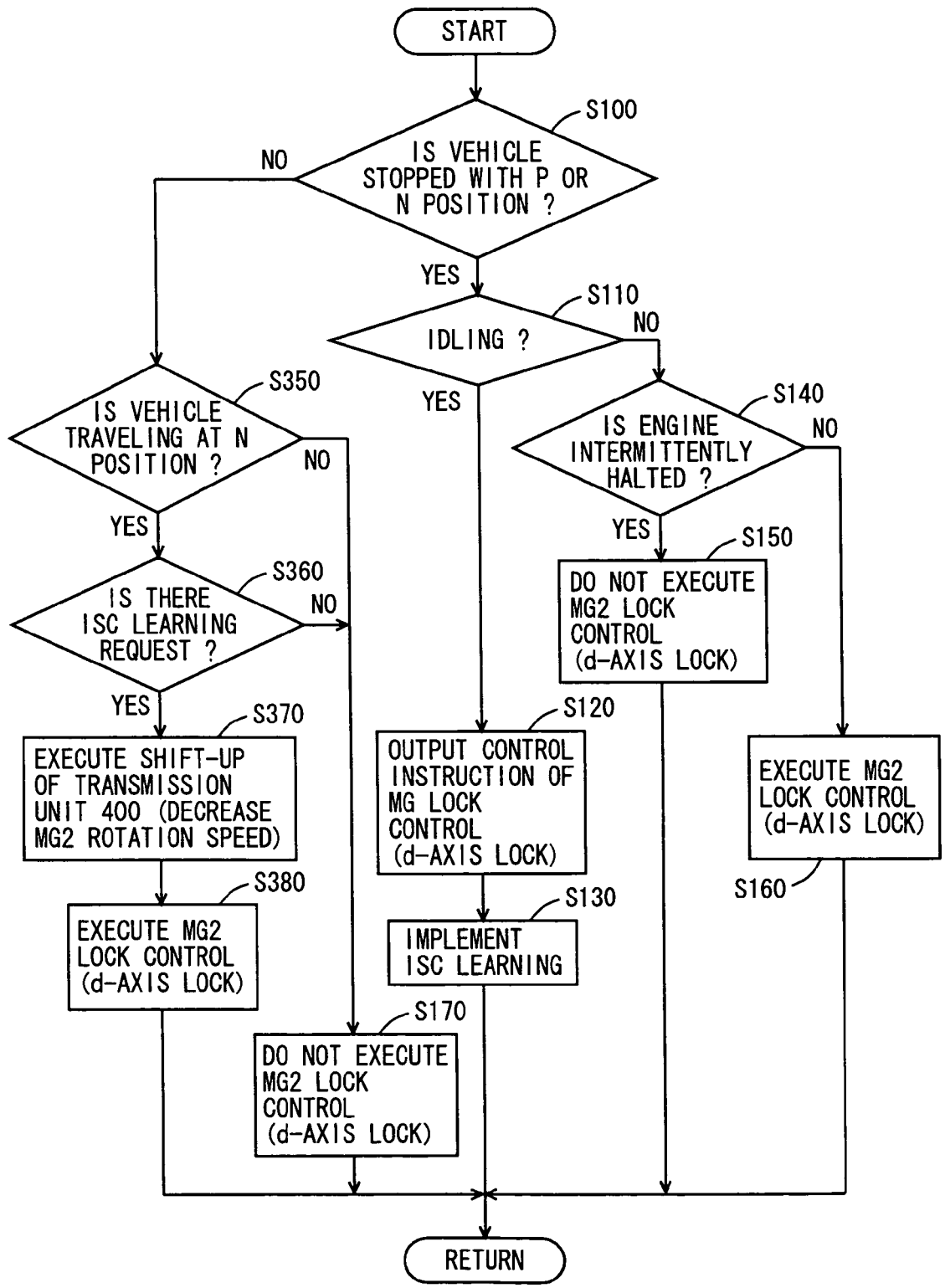
FIG. 14 is a flow chart for describing the implementation control of d-axis lock according to the second modification.

FIG. 14 is a flow chart for describing the implementation control of the d-axis lock according to the second modification. The control processing in accordance with the flow chart shown in FIG. 14 corresponds to the function of MG2 lock control portion 1300 shown in FIG. 12 and is realized by execution of the predetermined program previously stored in ECU 800, at a predetermined cycle.

Comparing FIG. 14 to FIG. 8, in the second modification, ECU 800 further executes Steps S350-S380 when the determination of Step S100 shows NO, in other words, when the release position (P position, N position) is not selected or when the vehicle is traveling.

ECU 800 determines, in Step S350, whether or not the vehicle is traveling and the N position is selected. When the vehicle is traveling and the N position is selected (determined as YES in S350), ECU 800 determines whether or not the ISC learning request is generated, in Step S360. In general, when the opportunity of the ISC learning cannot be appropriately assured during the stop of the vehicle, the ISC learning request is generated when the learning conditions are satisfied based on the temperature of the engine cooling water and the like.

In Step S370, ECU 800 executes the up-shift in second shift portion 400 by up-shift control portion 1500 (FIG. 12) when the ISC learning request is generated (determined as YES in S360) to thereby reduce the rotation speed of ring gear 328 (MG2 rotation speed). Further, ECU 800 outputs, in Step S380, a control instruction similar to that of Step S120 shown in FIG. 8 and executes the MG2 lock control. When the determination of Step S350 or S360 shows NO, Step S170 is implemented in a manner similar to FIG. 8, and the MG2 lock control is not executed.

According to the second modification thus configured, when the vehicle is traveling and the N position is selected, the ISC learning can be performed in the state where ring gear 328 of power split device 310 is still engaged by the MG2 lock control and the behavior of the engine rotation speed is stabilized.

Further, the rotation speed of ring gear 328 (MG2 rotation speed) can be speedily reduced as a result of the up-shift in second shift portion 400. Accordingly, ring gear 328 can be speedily locked by the lock control of second MG 312, and the ISC learning can be thereby speedily completed.

Figure 15:
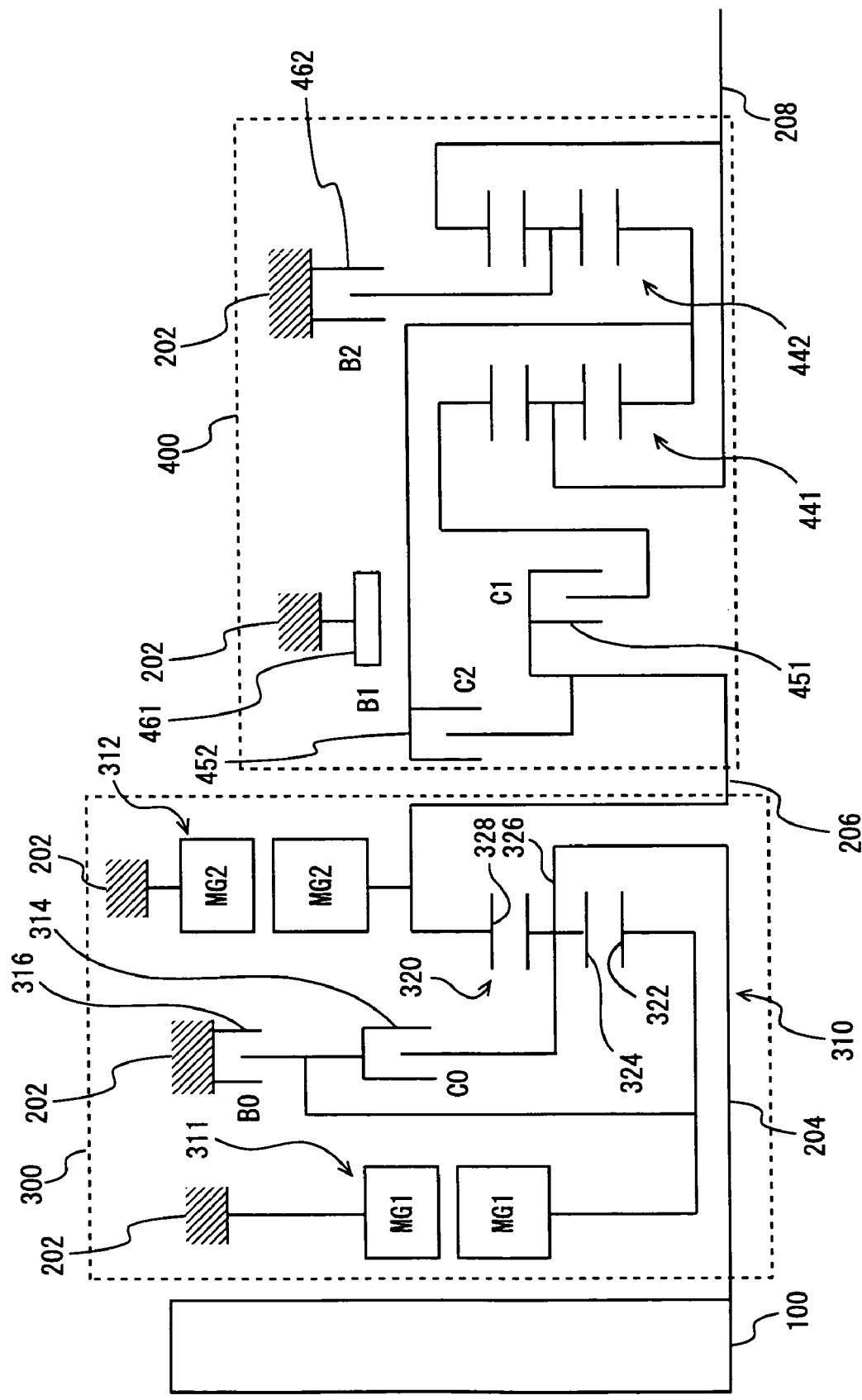
FIG. 15 is another exemplary configuration of the transmission shown in FIG. 1.

In transmission 200, four forward gears, which are first through fourth gears, can be formed in place of the five forward gears. In the case where the four forward gears can be formed in transmission 200, second shift portion 400 includes two planetary gears 441 and 442 of the single pinion type and four frictional engagement elements which are a C1 clutch 451, a C2 clutch 452, a B1 brake 461 and a B2 brake 462 as shown in FIG. 15. By the engagement of the frictional engagement elements in FIG. 15 in the combinations shown in the operation table of FIG. 16, the four forward gears, which are the first through fourth gears, can be implemented.

Figures 16, 17:
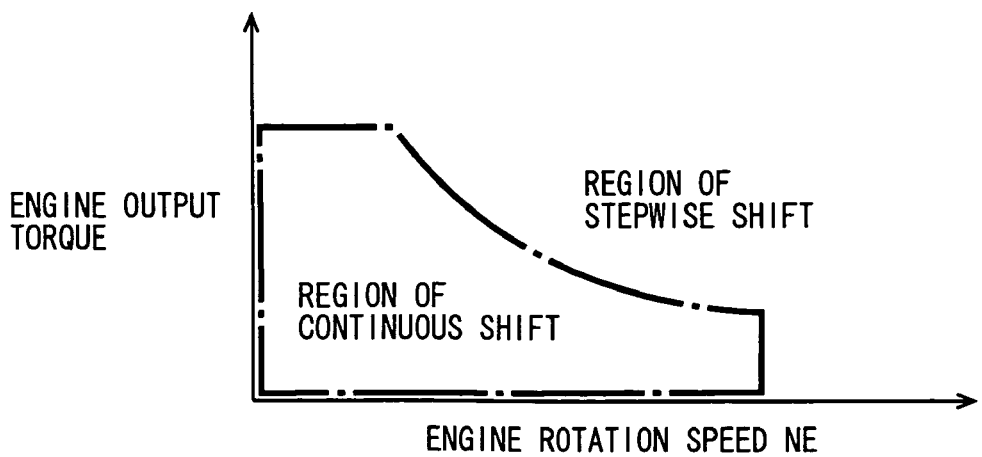
FIG. 16 is an operation table of the transmission shown in FIG. 15.
FIG. 17 is a conceptual view which describes another example of a switching control between a continuously shift state and a stepwise shift state.

Instead of switching between the continuous shift state and the stepwise shift state based on a switching line defined in the shift map, it is possible to switch between the continuous shift state and the stepwise shift variable state may be switched therebetween based on the map having the output torque of engine 100 and the engine rotation speed NE as parameters, as shown in FIG. 17.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A control device for a power train provided with:
   a differential mechanism having a first rotating element coupled with a rotor of a first rotating electric machine, a second rotating element coupled with a rotor of a second rotating electric machine, and a third rotating element coupled with an output shaft of an engine; and
   a transmission mechanism coupled with said second rotating element and transmitting torque inputted from said second rotating element to a wheel,
   said control device comprising:
   an idle speed control portion for controlling an engine rotation speed when said engine is in an idle operation;
   a learning control portion for implementing a learning control in order to correct a set amount of engine control by said idle speed control portion based on an actual engine rotation speed during said idle operation; and
   a rotation lock control portion for controlling power supply to said second rotating electric machine so that rotation of the rotor of said second rotating electric machine is locked by an electromagnetic force generated in said second rotating electric machine when said learning control is implemented at a time of selection of a predetermined shift position in which said second rotating element is not engaged with another rotating element in said transmission mechanism.

2. The control device for the power train according to claim 1, wherein
   said rotation lock control portion controls power supply to said second rotating electric machine so that rotation of the rotor of said second rotating electric machine is locked by said electromagnetic force during said idle operation of a stopped vehicle in which said predetermined shift position is selected.

3. The control device for the power train according to claim 1, wherein
   said learning control portion prohibits implementation of said learning control except for a period when power supply to said second rotating electric machine is controlled so that rotation of the rotor of said second rotating electric machine is locked by said electromagnetic force during said idle operation when said predetermined shift position is selected.

4. The control device for the power train according to claim 1, further comprising a learning condition determine portion for determining whether or not conditions for implementing said learning control are satisfied during said idle operation and generating a learning request when the conditions are satisfied, wherein
   said rotation lock control portion generates a control instruction for locking rotation of the rotor of said second rotating electric machine by the electromagnetic force when said learning request is generated by said learning condition determine portion at a time of selection of said predetermined shift position.

5. The control device for the power train according to claim 4, further comprising a rotation speed control portion for setting a targeted rotation speed of said first rotating electric machine in order to set a rotation speed of said second rotating electric machine to be around zero to control such that said first rotating electric machine is operated with said targeted rotation speed when said predetermined shift position is selected and said learning request is not generated by said learning condition determine portion during said idle operation of the stopped vehicle, wherein said targeted rotation speed is set in accordance with a product of an engine rotation speed targeted value by said idle speed control portion and a predetermined gear ratio in said differential mechanism.

6. The control device for the power train according to claim 1, wherein
said predetermined shift position includes a parking position and a neutral position, and
said rotation lock control portion controls power supply to said second rotating electric machine so that rotation of the rotor of said second rotating electric machine is locked by the electromagnetic force when said neutral position is selected and implementation of said learning control is instructed during said idle operation of the traveling vehicle.

7. The control device for the power train according to claim 6, wherein
said transmission mechanism is configured to transmit torque inputted to said second rotating element to a drive wheel in accordance with a gear ratio of each gear switched according to a predetermined combination of engagement and disengagement of a plurality of frictional engagement elements, and
said control device further comprises an up-shift portion for changing the gear of said transmission mechanism so that said gear ratio is changed in a direction where the rotation speed of said second rotating element is reduced when said neutral position is selected and implementation of said learning control is instructed during said idle operation of the traveling vehicle.

8. A control method for a power train provided with:
a differential mechanism having a first rotating element coupled with a rotor of a first rotating electric machine, a second rotating element coupled with a rotor of a second rotating electric machine, and a third rotating element coupled with an output shaft of an engine; and
a transmission mechanism coupled with said second rotating element and transmitting torque inputted to said second rotating element to a wheel,
the method comprising the steps of:
determining whether or not a predetermined shift position in which said second rotating element is not engaged with another rotating element in said transmission mechanism is selected; and
controlling power supply to said second rotating electric machine so that rotation of the rotor of said second rotating electric machine is locked by an electromagnetic force generated in said second rotating electric machine when a learning control to correct a set amount of an engine control by an idle speed control during an idle operation of said engine based on an actual engine rotation speed during said idle operation, when said predetermined shift position is selected.

9. The control method for the power train according to claim 8, wherein
in said step of controlling, power supply to said second rotating electric machine is controlled so that rotation of the rotor of said second rotating electric machine is locked by said electromagnetic force during said idle operation of a stopped vehicle in which said predetermined shift position is selected.

10. The control method for the power train according to claim 8, further comprising the step of prohibiting implementation of said learning control except for a period when power supply to said second rotating electric machine is controlled so that rotation of the rotor of said second rotating electric machine is locked by said electromagnetic force during said idle operation when said predetermined shift position is selected.

11. The control method for the power train according to claim 8, further comprising the step of determining whether or not a learning request to be generated when conditions for implementing said learning control are satisfied is generated during said idle operation, wherein
in said step of controlling, a control instruction for locking rotation of the rotor of said second rotating electric machine by the electromagnetic force is generated when said learning request is generated at a time of selection of said predetermined shift position.

12. The control method for the power train according to claim 11, further comprising the step of setting a targeted rotation speed of said first rotating electric machine in order to set a rotation speed of said second rotating electric machine to be around zero to control such that said first rotating electric machine is operated with said targeted rotation speed when said predetermined shift position is selected and said learning request is not generated during said idle operation of the stopped vehicle, wherein
said targeted rotation speed is set in accordance with a product of an engine rotation speed targeted value by said idle speed control and a predetermined gear ratio in said differential mechanism.

13. The control method for the power train according to claim 8, wherein
said predetermined shift position includes a parking position and a neutral position, and
in said step of controlling, power supply to said second rotating electric machine is controlled so that rotation of the rotor of said second rotating electric machine is locked by the electromagnetic force when said neutral position is selected and implementation of said learning control is instructed during said idle operation of the traveling vehicle.

14. The control method for the power train according to claim 13, wherein
said transmission mechanism is configured to transmit torque inputted to said second rotating element to a drive wheel in accordance with a gear ratio of each gear switched according to a predetermined combination of engagement and disengagement of a plurality of frictional engagement elements, and
said control method further comprises the step of changing the gear of said transmission mechanism so that said gear ratio is changed in a direction where the rotation speed of said second rotating element is reduced when said neutral position is selected and implementation of said learning control is instructed during said idle operation of the traveling vehicle.

* * * * *